US007010583B1

(12) United States Patent

Aizono et al.

(10) Patent No.: US 7,010,583 B1
(45) Date of Patent: Mar. 7, 2006

(54) TRANSPORT SYSTEM

(75) Inventors: Takeiki Aizono, Kawasaki (JP); Makoto Shioya, Tokyo (JP); Teruji Sekozawa, Kawasaki (JP); Koichi Sano, Yokohama (JP); Masanori Kataoka, Yokohoma (JP)

(73) Assignee: Hitachi, Ltd., Tokyo (JP)

( * ) Notice: Subject to any disclaimer, the term of this patent is extended or adjusted under 35 U.S.C. 154(b) by 665 days.

(21) Appl. No.: 09/645,450

(22) Filed: Aug. 25, 2000

(30) Foreign Application Priority Data

Dec. 24, 1999 (JP) ................................ 11-366247

(51) Int. Cl.
*G06F 15/16* (2006.01)
*G08G 1/123* (2006.01)

(52) U.S. Cl. ...................... 709/219; 709/241; 340/989

(58) Field of Classification Search ............ 455/456.2, 455/457, 414.3, 418, 456.5, 456.6; 709/232, 709/236, 219, 241; 701/201; 340/905, 989
See application file for complete search history.

(56) References Cited

U.S. PATENT DOCUMENTS 4,311,876 A 1/1982 Endo et al. .............. 455/456.2
5,187,810 A * 2/1993 Yoneyama et al. ......... 455/457
5,579,535 A * 11/1996 Orlen et al. ................ 340/905
5,610,821 A 3/1997 Gazis et al. ............. 455/456.2
6,047,327 A * 4/2000 Tso et al. ................... 709/232
6,049,711 A * 4/2000 Ben-Yehezkel et al. .. 455/414.3
6,081,805 A * 6/2000 Guha ............................ 707/5
6,091,956 A * 7/2000 Hollenberg .............. 455/456.5
6,097,313 A * 8/2000 Takahashi et al. .......... 340/905
6,115,754 A * 9/2000 Landgren .................... 709/236
6,154,745 A * 11/2000 Kari et al. ..................... 707/10
6,202,023 B1 * 3/2001 Hancock et al. ............ 701/201
6,311,058 B1 * 10/2001 Wecker et al. .............. 455/418
6,397,040 B1 * 5/2002 Titmuss et al. .......... 455/412.2
6,580,914 B1 * 6/2003 Smith ...................... 455/456.6
6,731,612 B1 * 5/2004 Koss .......................... 455/461

FOREIGN PATENT DOCUMENTS

| | | |
|---|---|---|
| EP | 0756153 | 1/1997 |
| EP | 0982698 | 3/2000 |
| JP | 6-269044 | 9/1994 |
| WO | 98/53436 | 11/1998 |

* cited by examiner

*Primary Examiner*—Patrice Winder
(74) *Attorney, Agent, or Firm*—Mattingly, Stanger, Malur & Brundidge, P.C.

(57) ABSTRACT

A transport system composed of road side stations installed along roads and vehicles running on roads, wherein emergency processing at the time of an accident, a local information providing service, and so on are realized by the road side stations in cooperation of the road side stations and the respective vehicles. In the transport system, a plurality of road side stations are interconnected through a road side communication network, and a plurality of vehicles communicate with the road side stations. A vehicle transmits a request message containing a service code and location information. A road side station receiving the request message broadcasts the request message to the network. The road side stations receive the message, and determine whether or not requested processing should be executed based on the service code and the location information. When determining that the processing should be executed, the road side station executes processing indicated by the service code.

7 Claims, 22 Drawing Sheets

NETWORK TOPOLOGY

CONFIGURATION OF RELAY DEVICE

MESSAGE FLOW 1

MESSAGE FLOW 2

FIG.8A 800 (801, 802)

| SERVICE CODE | DISTANCE INFORMATION | |
|---|---|---|
| 1 | 1000 | 8001 |
| 5 | —— | 8002 |
| 7 | —— | 8003 |

SERVICE CODE TABLE

FIG.8B 850 (851, 852)

| LATITUDE INFORMATION | LONGITUDE INFORMATION |
|---|---|
| NORTH LATITUDE 35° 35' 00" | EAST LONGITUDE 138° 27' 55" |

LOCATION INFORMATION TABLE

FIG.10A

1000

| LATITUDE INFORMATION (1001) | LONGITUDE INFORMATION (1002) |
|---|---|
| NORTH LATITUDE 35° 32' 00" | EAST LONGITUDE 138° 26' 23" |

LOCATION INFORMATION TABLE

FIG.10B

1030

| DISTANCE INFOMATION |
|---|
| 100000 |

DISTANCE INFORMATION TABLE

FIG.10C

1050

| ROAD ATTRIBUTE (1051) | | INTERFACE ID (1052) | |
|---|---|---|---|
| ROUTE 246 | NORTH | 1 | 10501 |
| ROUTE 246 | SOUTH | 2 | 10502 |
| KAMI ASO STREET | NORTH WEST | 3 | 10503 |

ROUTE INFORMATION TABLE

RESPONSE MESSAGE 1

RESPONSE MESSAGE 2

REQUEST MESSAGE

RESPONCE MESSAGE

TRANSPORT SYSTEM

BACKGROUND OF THE INVENTION

The present invention relates to a transport system which is configured of road side stations installed along roads and vehicles running thereon. More particularly, the present invention relates to intelligent transport systems, i.e., a so-called ITS.

A video information providing system has been proposed for providing a driver in a running vehicle with visual information on the front which is blocked and therefore made invisible by other vehicles running ahead. This system comprises a plurality of computers each equipped with a camera, connected to a network which is routed along roads to share video information among the respective computers. Also, JP-A-6-269044, for example, describes a local information service system which allows a driver in a running vehicle to access a local information database through a nearby radio communication base station from the running vehicle, so that the driver is provided with local information.

SUMMARY OF THE INVENTION

For providing a driver in a vehicle with an information providing service in a conventional transport system, information provided to the driver is typically acquired from a server machine, such as a local information server for managing local information in a region in which the vehicle is running. This system, however, presents several problems such as a delay in response time due to the processing concentrated on the server machine, and a failure in receiving information providing services when the server machine shuts down.

A system for providing a driver in a vehicle with information by sharing the information among vehicles and road side stations employs an approach which forces the driver to specify a particular road side station which possesses desired information in order to acquire the information. This approach requires the driver to specify a road side station from which information is acquired, so that if the system frequently changes the configuration or if the system changes the types of information stored therein, the driver cannot acquire desired information from the specified road side station.

To solve the problems mentioned above, one aspect of a transport system according to the present invention is characterized in that:

(1) a road side station adds the contents of a service requested by a vehicle and vehicle location information to a message, and broadcasts the message to a network;

(2) one of road side stations connected to the network, which has received the message, determines whether or not it should execute processing involved in the request based on a service code indicative of the contents of processing requested through the message by the vehicle, and the location information; and (3) the road side station executes the processing when it determines so.

The processing in (2) is executed based on the location information indicative of the location of the vehicle and the location information indicative of the location of the road side station. The vehicle location information indicates a location at which the vehicle existed in the past; a location at which the vehicle currently exists; and a location at which the vehicle is scheduled to exist in future.

BRIEF DESCRIPTION OF THE DRAWINGS

FIGS. 8A and 8B show examples of structures for tables possessed by the road side station;

FIGS. 10A, 10B and 10C show examples of structures for tables possessed by the relay device, respectively;

DESCRIPTION OF THE EMBODIMENTS

Figure 1:
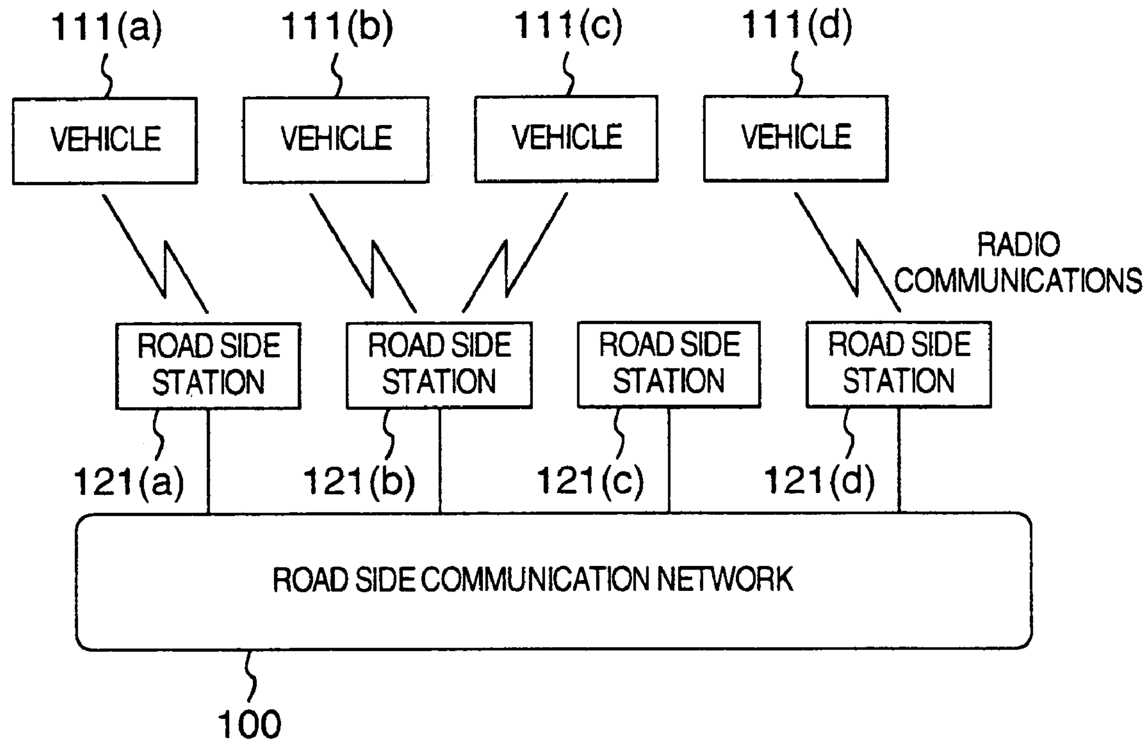
FIG. 1 is a block diagram illustrating the configuration of a transport system according to the present invention.

A transport system according to the present invention will hereinafter be described with reference to the accompanying drawings. FIG. 1 illustrates an exemplary configuration of the transport system according to the present invention. Road side stations 121(*a*)–121(*d*) are connected to a road side communication network 100, so that the respective road side stations can communicate with one another through the road side communication network 100. The road side communication network 100 may comprise, for example, optical fiber cables which are routed along roads by Ministry of Construction of Japan. Each road side station communicates with a running vehicle (vehicles) through radio communications. In the example illustrated in FIG. 1, the road side station 121(*a*) is communicating with a vehicle 111(*a*); the road side station 121(*b*) with vehicles 111(*b*), 111(*c*); and the road side station 121(*d*) with a vehicle 111(*d*).

As used herein, the radio communications refer to dedicated short range communications system DSRC for bidirectional communications, for example, between road side stations and running vehicles in a short range. It should be noted that while DSRC is given herein as an example, the present invention is not limited to DSRC, and any other system may be used as long as running vehicles and road side stations can communicate information and data with one another.

Figure 2:
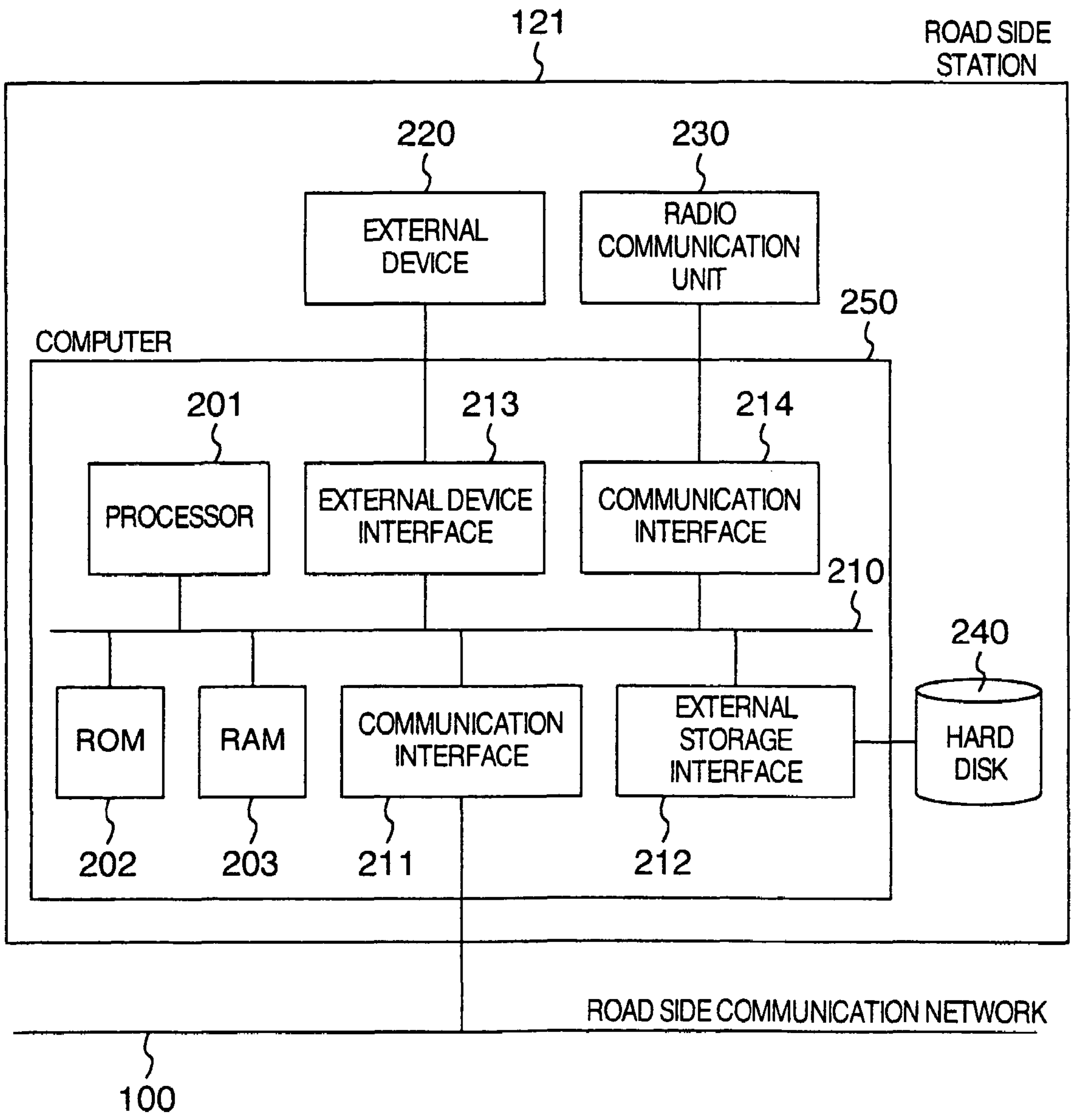
FIG. 2 is a block diagram illustrating the configuration of a road side station.

FIG. 2 illustrates the configuration of the road side station. The road side station 121 comprises a computer 250 for processing information; a hard disk 240 serving as a non-volatile storage medium for storing programs and data; a radio communication unit 230 for performing radio communications with a vehicle (vehicles); and an external device 220 such as a camera, a variety of sensors, or the like. The computer 250 comprises a processor 201 for processing operations involved in the execution of a program; a ROM 202 for storing a basic program such as an operating system (OS), and basic data; a RAM 203 for use as a work area during the execution of a program and as a temporary storage area for data; a communication interface 211 for connection with a road side communication network 100; an external storage interface 212 for connecting the hard disk 240; an external device interface 213 for transmitting and receiving data to and from the external device 220; and a communication interface 214 for transmitting and receiving data to and from a radio communication device. These components communicate data with one another through a bus 210. A program executed on the processor 201 can communicate with a single or a plurality of vehicles through the communication interface 214 and the radio communication device 230, and communicate with other road side stations through the communication interface 211 and the road side communication network 100. The program further collects information such as external video, audio, vibration, temperature, humidity, atmospheric pressure and so on through the external device interface 213 and the external device 220.

Figure 3:
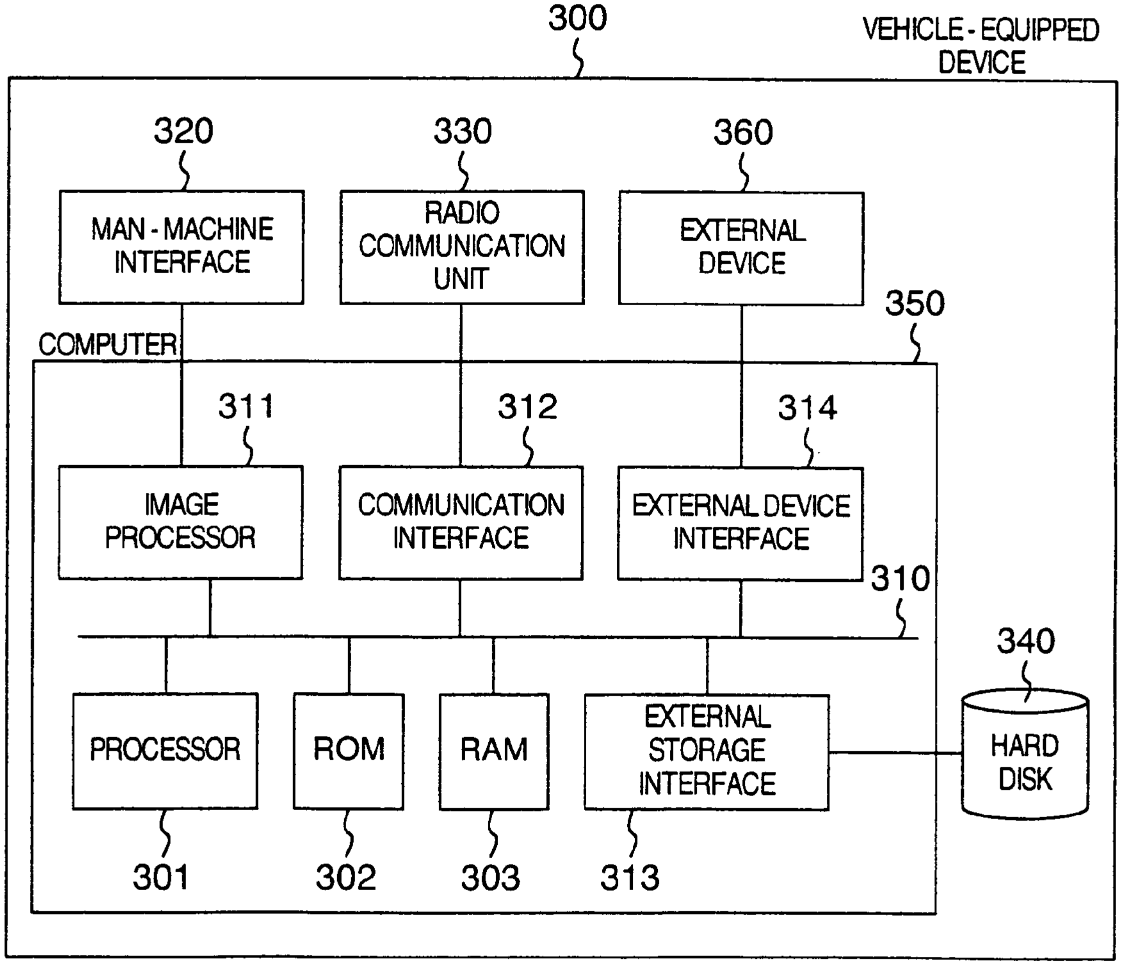
FIG. 3 is a block diagram illustrating the configuration of a vehicle-equipped device.

FIG. 3 illustrates the configuration of a vehicle-equipped device. The vehicle-equipped device 300 is a device equipped in a vehicle, and may be represented, for example, by a car navigation system. The vehicle-equipped device 300 comprises a computer 350; a man-machine interface 320; a radio communication unit 330; a hard disk 340 serving as a non-volatile external storage device; and an external device 360. The man-machine interface 320 may comprise a liquid crystal display having, for example, a touch panel function for displaying images for a driver in the vehicle and for reading information entered by the driver. The radio communication unit 330 is a unit for radio communications with road side stations. The hard disk 340 is a storage device for storing map information and so on, and may be replaced with an arbitrary non-volatile storage device such as a CD-ROM drive, a DVD-ROM drive or the like. The external device 360 may comprise a receiver for receiving data, for example, in accordance with the Global Positioning System (GPS) developed by Department of National Defense of the United States, and capture data necessary to compute coordinate information such as latitude and longitude. The external device 360 may be also connected to a variety of sensors for sensing vehicle conditions in addition to the GPS receiver.

The computer 350 comprises a processor 301 for processing operations involved in the execution of a program; a ROM 302 for storing programs and basic data; a RAM 303 for use as a work area during the execution of a program and as a temporary storage area for data; an image processor 311 for controlling the man-machine interface 320; a communication interface 312 for transmitting and receiving data to and from the radio communication unit 330; an external storage interface 313 for transmitting and receiving data to and from the hard disk 340; and an external device interface 314 for use in transmitting and receiving data to and from the external device 360. The respective components communicate data with one another through a bus 310.

The processor 301 executes a program stored in the ROM 302 for computing a route for the vehicle, and produces route information for the vehicle by processing information on a destination entered by the driver in the vehicle through the man-machine interface 320, the map information stored in the hard disk 340, and GPS information received by the external device 360.

Figure 4A:
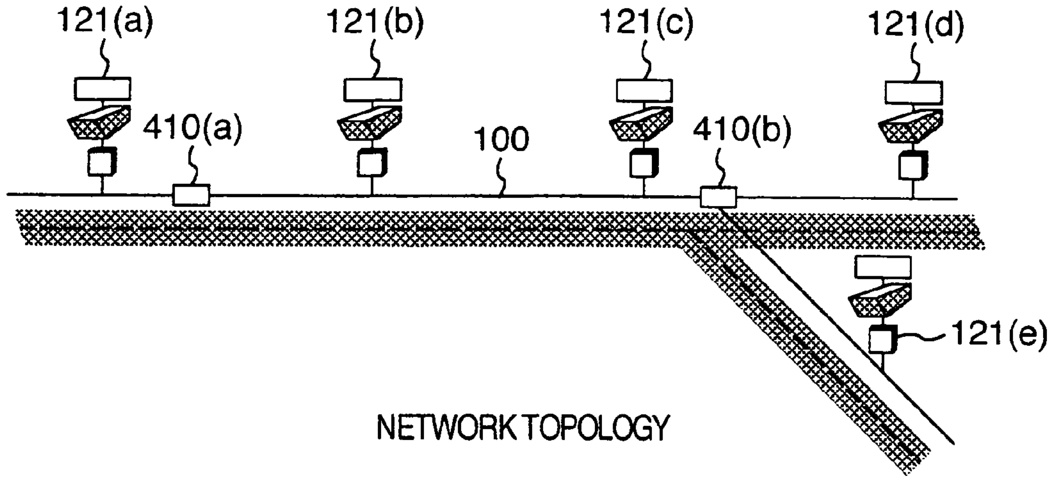
FIG. 4A is a schematic diagram illustrating the topology of a road side communication network.

FIG. 4A illustrates the configuration of the road side communication network. The road side communication network 400 may be implemented by transmission media such as optical fiber cables, and routed along roads such as a road 420 in the figure. Road side stations 121(*a*)–121(*e*) connected to the road side communication network 400 mutually transmit and receive messages as required through the road side communication network 400. Each segment forming part of the road side communication network 400 is connected to a relay device for extending the transmission distance, and for branching a segment into two or joining two segments into one. As used herein, the segment refers to a physically continuous transmission segment, so that the road side communication network 400 is composed of a plurality of segments and relay devices.

A relay device 410(*a*), for example, may amplify an electric signal attenuated due to a light loss through an optical fiber cable and extend the transmission distance. A relay device 410(*b*) installed at a branch point branches the road side communication network 400 conforming to the branching of the road 420. These relay devices enable the road side communication network to be routed along roads.

The functions of the relay device are not merely limited to the amplification of electric signals and physical branch/joint of the road side communication network. Each relay device may contain a program for discarding a received message in accordance with the contents of the message, or for selecting a segment to which a message is forwarded. As used herein, forwarding refers to transmission of a message received by one segment to another or a plurality of other segments.

Figure 4B:
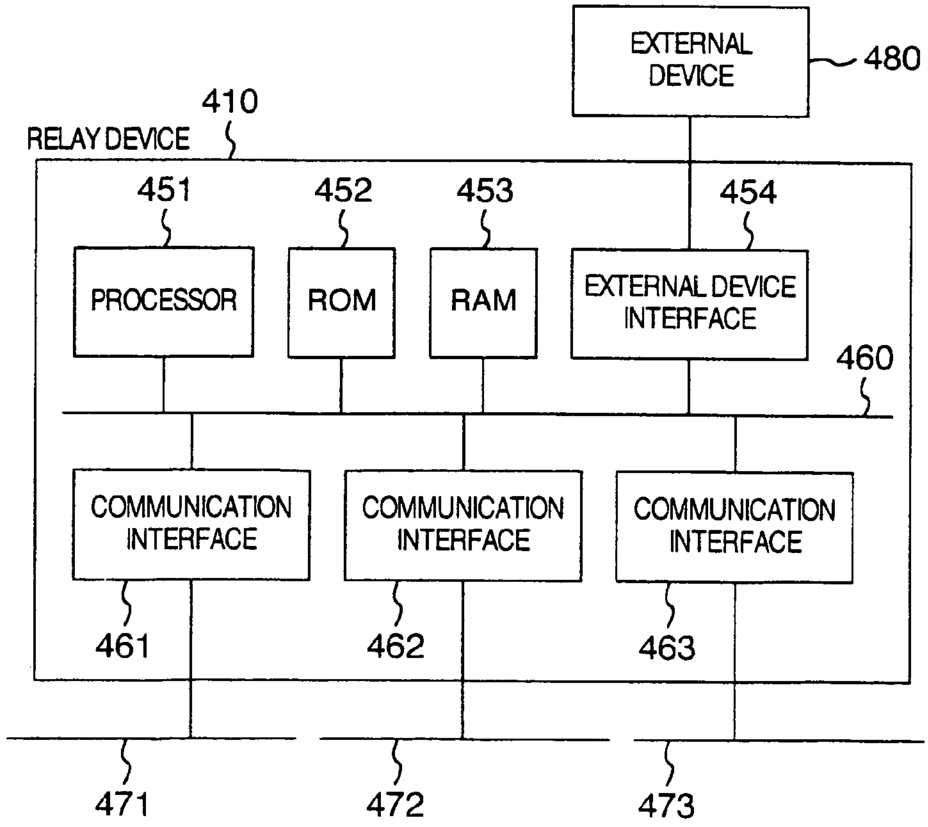
FIG. 4B is a block diagram illustrating the configuration of a relay device.

FIG. 4B illustrates the configuration of the relay device. The relay device comprises a computer 410 and an external device 480.

The computer 410 comprises a processor 451 for executing a program; a ROM 452 for storing programs; a RAM 453 for use as a work area for a program; an external device interface 454; and communication interfaces 461, 462, 463. The respective components mutually transmit and receive data through a bus 460. The external device 480 may comprise, for example, a GPS receiver from which the processor 451 receives data through the external device interface 454 to compute location information such as longitude and latitude. Each communication interface is connected to one segment. The processor 451 can transmit and receive a message through the communication interface 461 using a segment 471; transmit and receive a message through the communication interface 462 using a segment 472; and transmit and receive a message through the communication interface 463 using a segment 473. The number of communication interfaces incorporated in each relay device 440 is two in a relay device 410(*a*) installed beside the road; three for a relay device 410(*b*) installed near a three-forked road; and four for a relay device 410 installed near an intersecting street.

Next, a processing scheme for the transport system according to the present invention will be described. Each road side station connected to the road side communication network requests another road side station to execute processing. The execution of the processing is classified into (I) without response and (II) with response. A request without response (I) is issued when the execution of processing is merely requested to another road side station. A request with response (II) is issued when a response is required for the request, for example, when information possessed by another road side station is requested. For the processing scheme, the case (I) will be described with reference to FIGS. 5 through 12, while the case (II) will be described with reference to FIGS. 13 through 18.

Figure 5A:
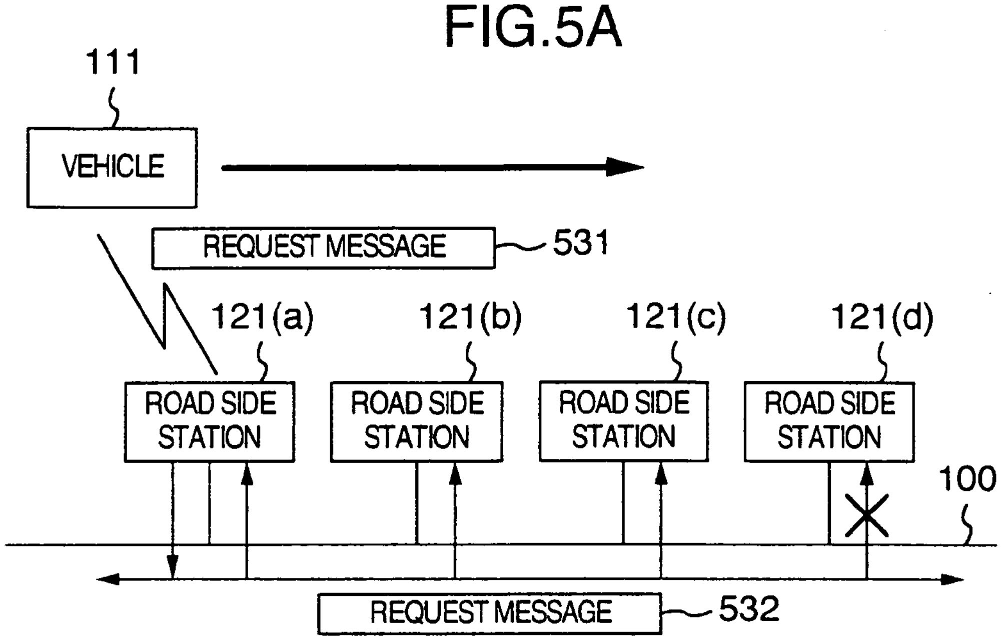
FIGS. 5A and 5B show message flows involved in processing requests which do not require a response, respectively.

First, for the case (I), FIG. 5A shows an example of a message flow which does not pass any relay device. When a road side station 121(*a*) requests the execution of processing, the road side station 121(*a*) requesting the processing broadcasts a request message 532 to a segment 500. The request message 532 is received by all road side stations connected to the segment 500, so that each of the road side stations which have received the message determines whether or not it executes the processing based on the contents of the request message 532. It should be noted that road side stations which receive a request message may be limited to those which exist in an advancing direction of an vehicle 111 which has issued a request message 531. In the example illustrated in FIG. 5A, the road side station 121(*a*) which has received the request message 531 from the vehicle 111 broadcasts the request message 532 to the segment 500, such that the request message 532 is received by road side stations 121(*a*), 121(*b*), 121(*c*) and 121(*d*) connected to the same segment 500. The road side station 121(*a*), which has transmitted the request message 532 also receives the request message 532, and executes the same processing as the other road side stations. Each of the road side stations determines whether or not it executes the processing based on the contents of the request message 532, and the road side stations 121(*b*) and 121(*c*), for example, determine that they must execute the processing, and execute the processing. Here, the request messages 531, 532 may be different or identical. When they are different, the message 532 may be compressed for facilitating the transmission, or may be modified to another format. It should be noted however that the contents of requested processing must be the same in the request messages 531, 532. The same applies to request messages 531, 532(*a*), 532(*b*) shown in FIG. 5B. Likewise, the request messages 532(*a*), 532(*b*) may be changed to another format depending on a particular situation on the communication route.

Figure 6:
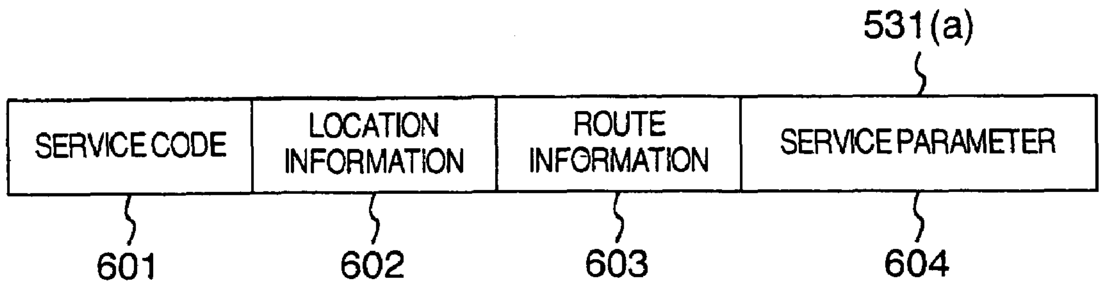
FIG. 6 shows a format for a request message in a processing request which does not require a response.

The request message 531 transmitted from the vehicle 111 to the road side station 121(*a*), and the request message 532 transmitted from the road side station 121(*a*) to the segment 500 are constructed in the same message format. The format for the request message is shown in FIG. 6. The request message 531(*a*) is comprised of a service code 601 indicative of the type of requested processing; location information 602 indicative of the location of the vehicle; route information 603 indicative of a route of the vehicle; and a service parameter 604 for use in executing the processing. Depending on the type of the processing indicated by the service code 601, the service parameter 604 may not be required. The location information 602 may be coordinate information, for example, consisting of longitude and latitude. The location information 602 may indicate the location of the vehicle at the time the request message 531 is transmitted. Alternatively, the location information 602 may indicate the location at which the driver desires to receive a service requested through the request message 531. Further alternatively, the location information 602 may include both locations. The route information 603 may comprise, for example, the names of roads passed through by the vehicle until it reaches certain destination, vector information indicative of an advancing direction of the vehicle, and so on. The route information 603 may be route information computed by the navigation system, or a scheduled route entered by the driver. Alternatively, the route information 603 may be a scheduled route based on a service schedule information when buses, railways or the like are concerned. Further, the route information 603 may be combined with the location information 602. The service parameter 604 is a parameter necessary to execute the processing indicated by the service code 601. In addition, though not shown in FIG. 6, speed information indicative of the speed of the vehicle may be included in the request message 531(*a*). The speed information may be the speed of the vehicle at the time a request message is transmitted, or an average speed for a predetermined period of time (for example, for a period of time for which the vehicle is running on a road on which the request message is transmitted, or for one day). Alternatively, the speed information may be a predicted speed (including a predicted speed at the time the driver desires to receive a service), or a predicted average speed based on the route information. Further, the speed information may include at least one of the foregoing.

Furthermore, the request message 531 may include time information indicative of a time at which the driver desires to receive a requested service, and a period of time for which the driver desires to receive a requested service. This time information may be included in the service code 601 or in the service parameter 604.

Figure 7:
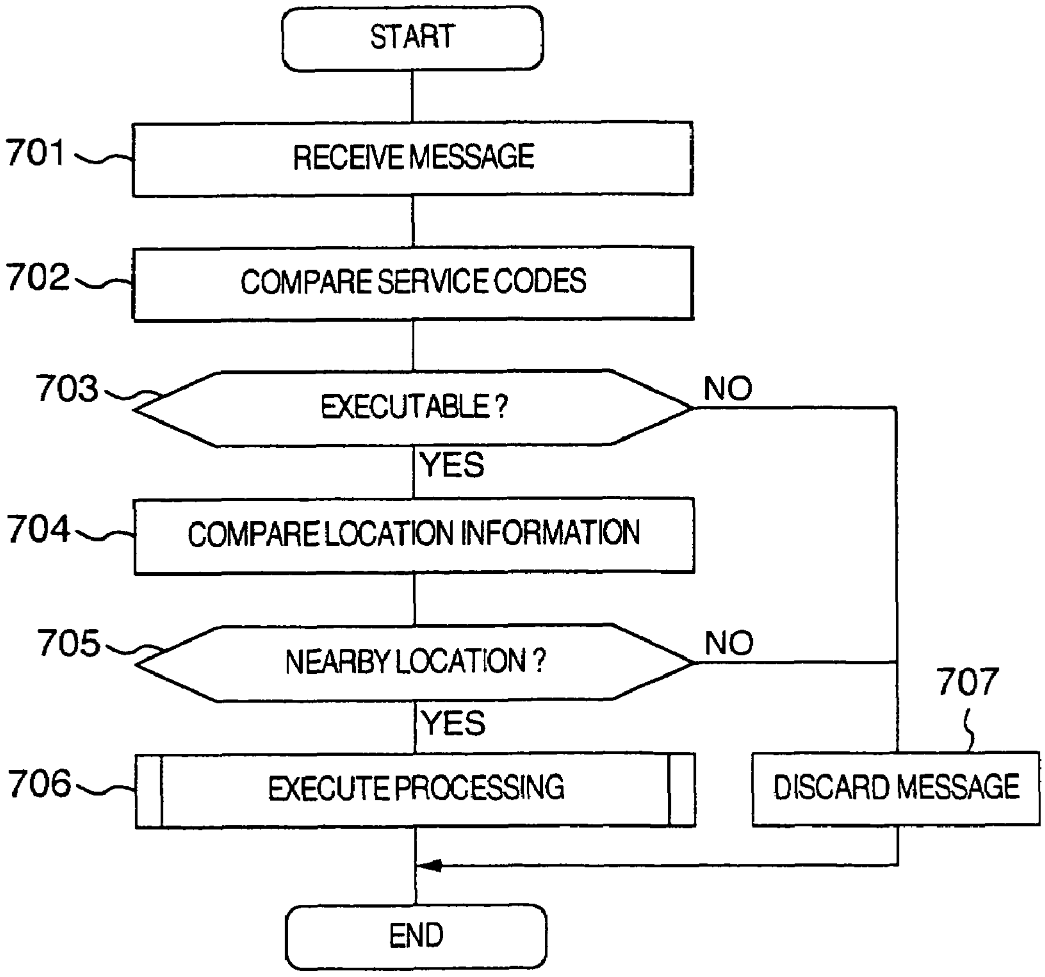
FIG. 7 is a flow chart illustrating a processing flow executed by the road side station in a processing request which does not require a response.

FIG. 7 illustrates a processing flow executed by the road side stations 121(*a*)–121(*d*) upon receipt of the request message 532 transmitted from the road side station 121(*a*) which had received the request message 531 from the vehicle 111. Upon receipt of the request message 532 (step 701), each road side station reads a service code 601 from the received request message 532, and compares the read service code 601 with a service code registered in a service code table of itself (step 702). The structure of the service code table is shown in FIG. 8A. The service code table 800 registers a service code 801 indicative of the type of processing which can be executed by the road side station. The service code table 800 also registers distance information 802 for each service. For example, in the service code table 800, "1,000 meters" is registered as the distance information 802 for a service identified by the service code 801 set at "1" (8001). This indicates that the processing indicated by service code (801) set at "1" is executed only when a requesting vehicle exists within 1,000 meters from the road side station. In other words, the distance information 802 serves as information indicative of the distance between the vehicle which receives the processing (service) and the road side station which executes the processing. The distance information 802 is not registered for a service identified by the service code 801 set at "5," indicating that the processing indicated by this service code can be executed irrespective of the location of a vehicle which has requested the processing (8002).

These service code 801 and distance information 802 are registered when a processing program for executing a service is downloaded to the road side station. The road side station compares the service code 801 in the service code table 800 with the service code 601 in the request message 532 (step 702), determines that the processing cannot be executed if the same service code is not registered (step 703), and discards the received request message (step 707). Conversely, if the same service code has been registered, the road side station determines that the processing can be executed (step 703), and compares location information 602 in the request message 532 with the location information registered in a location information table stored therein.

The location information is represented by longitude and latitude. The structure of the location information table is shown in FIG. 8B. The location information table 850 registers latitude information 861 and longitude information 852 for the location at which the road side station is installed. The road side station compares the location information 602 in the request message 532 with the location information in the location information table 850 to determine whether or not the requesting vehicle is running near the road side station (step 705). The location information registered in the location information table 850 may be information indicative of a location at which the road side station can execute the processing.

The determination as to whether the requesting vehicle exists near the servicing road side station is made based on the distance between the vehicle and the road side station. The location of the vehicle is based on the location information 602. The location of the vehicle may be represented by the location information 602 itself, or the road side station may calculate where the vehicle will be located at the time the processing (service) is executed, based on the location information 602 and the route information 603. In this event, instead of the location information, the road side station may calculate the time at which the vehicle desires to receive the service. In this alternative, the comparison at step 704 in FIG. 7 is made in the following manner. The road side station estimates a location at which the vehicle will exist at the time it will receive the service, from the time at which the vehicle transmitted the request message, the speed of the vehicle, and an average speed of the vehicle through roads (including scheduled ones) on which the vehicle runs, and makes the comparison based on the result of the estimation.

Further, the road side station may estimate the time at which the service will be completed without receiving the time at which the vehicle desires to receive the service from the vehicle, and estimate a location at which the vehicle exists at the estimated time, from the speed of the vehicle and an average speed of the vehicle through roads (including scheduled ones) on which the vehicle runs.

Further alternatively, the determination as to whether the requesting vehicle exists near the servicing road side station may be made based on certain location of the vehicle. Specifically, the determination may be made by comparing a location at which the vehicle will receive the service (a location at which the vehicle transmitted the request message, and an estimated location at which the vehicle will receive the service at the time the vehicle will receive the service) with a location of the vehicle at which each road side station can execute the processing. In this event, instead of a location of the vehicle at which each road side station can execute the processing, represented by a single coordinate point, a range may be specified, such that the comparison may be made by determining whether or not the coordinates indicated by location information transmitted from the vehicle is included in the range.

The road side station calculates the distance between itself and the requesting vehicle from the two pieces of coordinate information (the location information 602 in the request message 532 and the location information in the location information table 850), and determines that the vehicle is running near the road side station when the distance is smaller than the distance information 802 corresponding to the service code 801 identical to the service code 601 in the request message 532. If no information is registered in the distance information 802, the road side station regards the distance information 802 as infinity, and determines that the requesting vehicle is running near the road side station. When the road side station determines that the requesting vehicle is not running near the road side station (step 705), the road side station discards the message (step 707), followed by termination of the processing flow. Conversely, upon determining that the requesting vehicle is running near the road side station (step 705), the road side station executes the processing indicated by the service code 601 (step 706).

An example of the processing indicated at step 706 will be discussed in an exemplary case of a service system, later described. If all road side stations determine that the message should be discarded (the processing cannot be executed in the transport system), information indicative of the contents of the processing or information indicating that the processing has been executed is not transmitted to the vehicle-equipped device 300 in the vehicle. Therefore, if the vehicle-equipped device 300 does not receive at least one of the information indicative of the contents of the processing and the information indicating that the processing has been executed is not transmitted even after a predetermined period of time has passed, the driver may be notified that the processing (service) is not available (through a display or an audio message).

Figure 5B:
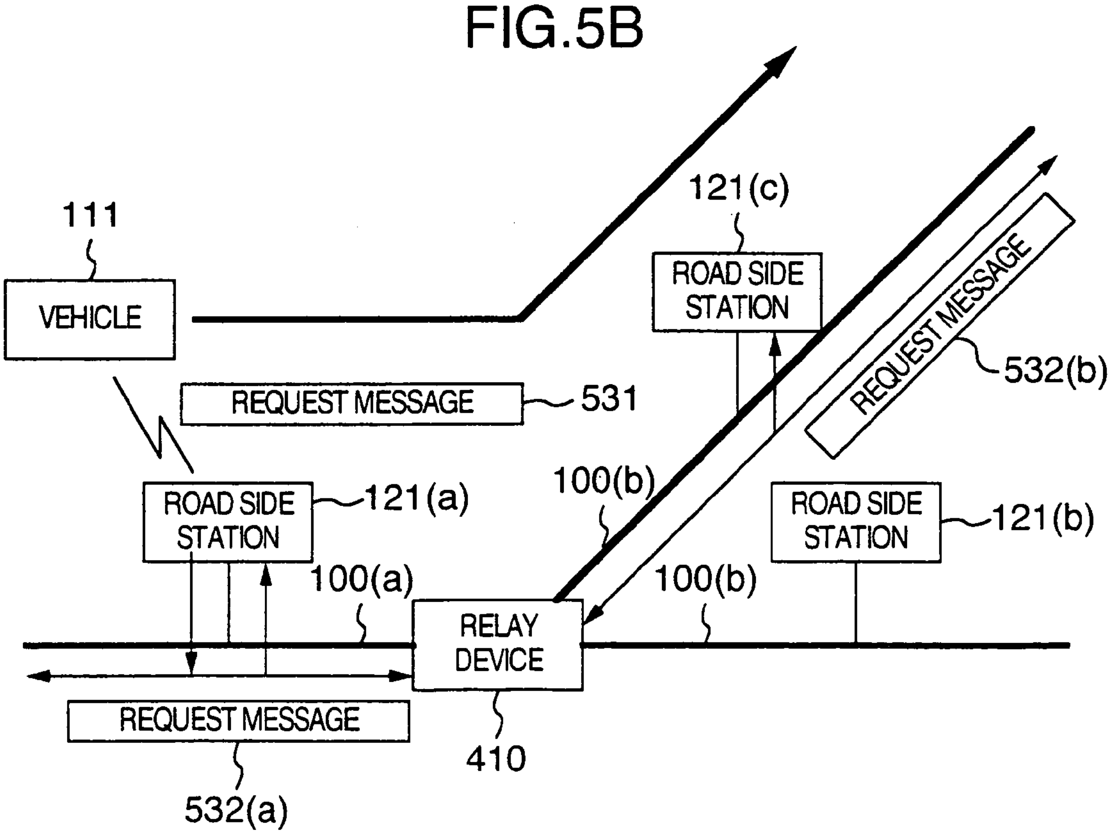

FIG. 5B shows a message flow when a relay device is included, i.e., when a road is branched into two. A relay device 410 is connected to three segments (segments 500(*a*)–500(*c*)) installed along the road. Each segment is connected to a plurality of road side stations. In the example shown in FIG. 5B, the segments 500(*a*)–500(*c*) are connected to road side stations 121(*a*)–121(*c*), respectively. A vehicle 111 is running on the road, and advancing toward the branched road. As the vehicle 111 transmits a request message 531, the road side station 121(*a*) receives the request message 531, and broadcasts the request message 532(*a*) to the segment 500(*a*). The broadcast request message 532(*a*) is received by all of the relay device and the road side stations connected to the segment 500(*a*). The processing executed in each of the road side stations and the message format of the request message 532(*a*) are identical to those shown in the example of FIG. 5A. In the following, the description will be centered on a processing scheme for the relay device 410.

Figure 9:
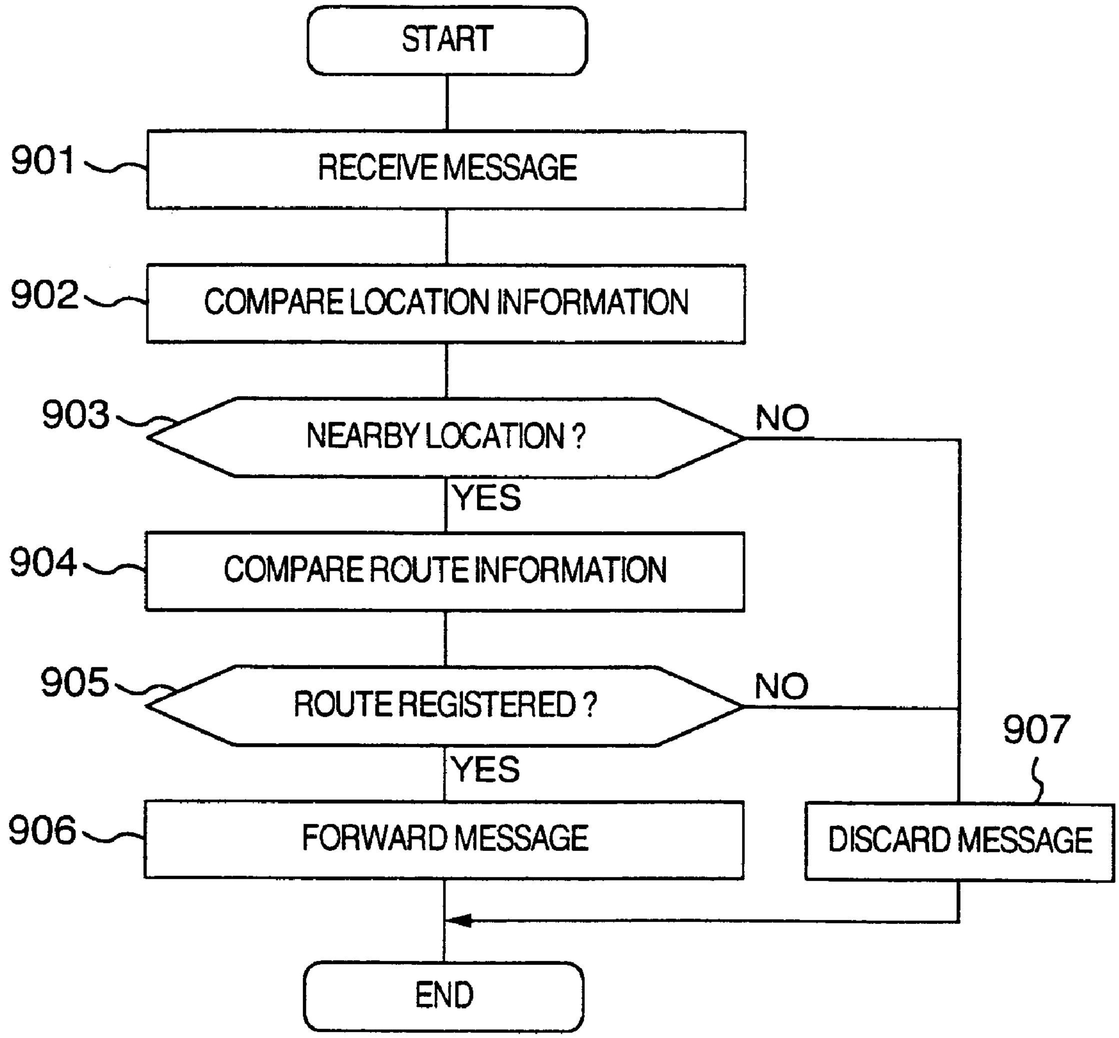
FIG. 9 is a flow chart illustrating a processing flow executed by a relay device upon receipt of a request message.

FIG. 9 illustrates a processing flow executed by the relay device 410. Upon receipt of the request message 532(*a*) (step 901), the relay device 410 read location information 602 in the request message 532(*a*), and compares the read location information 602 with location information registered in the location registration table stored therein (step 902). The location information registered in the location information table indicates the location at which the relay device is installed. Alternatively, the location information may indicate a location of the vehicle at which a road side station, relayed by the relay device, can execute requested processing. Further alternatively, the location information may indicate a location at which a road side station, relayed by the relay device, is installed.

Furthermore, the location information may include at least one of the alternatives mentioned above. FIG. 10A shows the structure of a location information table 1000 stored in the relay device 410. Longitude information 1001 and latitude information 1002 registered in the location information table 1000 may be calculated based on data read through the external device 480, and automatically registered therein, or manually entered by a human operator upon installation of the relay device. The relay device calculates the distance between itself and the vehicle from the location information 602 in the request message 532(*a*) and the location information registered in the location information table 1000, and determines whether or not the location of the vehicle 111 is near the relay device 410 (step 903). The determination as to whether the location of the vehicle 111 is near the relay device 410 is made based on a distance information table 1030 shown in FIG. 10B. It is assumed that data have been previously registered in the distance information table 1030. Then, the relay device 410 compares the calculated distance between the two locations with a distance registered in the distance information table 1030 (in the example shown in FIG. 10B, 100,000 meters) (step 902). Alternatively, the determination as to whether the location of the vehicle 111 is near the relay device 410 may be made in consideration of an advancing direction of the vehicle. For example, when separate networks are installed corresponding to ascending and descending lanes of a road, a relay device connected to the network corresponding to the descending lane may determine from a request message 531 generated by a vehicle running on the ascending lane that the vehicle is not located near the relay device even if the distance therebetween is short. Further alternatively, the locations of the road side stations 121(*b*), 121(*c*), relayed by the relay device, may be registered as location information, such that the distance may be calculated from this location information and the location of the vehicle.

The relay device determines that the location of the vehicle is not near the relay device when the calculated distance between the two is longer than the distance registered in the distance information table 1030 (step 903), and discards the message (step 907). Conversely, the relay device determines that the location of the vehicle is near the relay device when the calculated distance between the two is shorter than the distance registered in the distance information table 1030 (step 903), reads route information 603 registered in the request information 542(*a*), and compares the read route information 603 with a route information table stored therein (step 904). The structure of the route information table is shown in FIG. 10C. The route information table 1050 registers a road attribute 1051 and an interface ID 1052. The road attribute 1051 is attribute information on respective roads which intersect at a branch point, and is registered with information on the name and an extending direction of each road. The interface ID is an identifier previously assigned to each communication interface in the relay device, and corresponds to a communication interface on one-to-one basis. Here, the route information stored in the relay device 410 is information indicative of the route of roads corresponding to a network (segment) to which the relay device 410 is connected. Alternatively, the route information may indicate the route of the network instead of the route of roads.

For example, the interface ID set at "1" corresponds to the communication interface 461; the interface ID set at "2" to the communication interface 462; and the interface ID set at "3" to the communication interface 463. A program executed on the processor 451 references the route information table 1050 to select a segment (road) to which a message is transmitted, and transmits the message to the selected segment. For example, for transmitting a message in the north direction along Route 246, it can be known that the north direction of Route 246 corresponds to the interface ID set at "1" from the route information table 1050 (10501). Since it is previously determined that the interface ID set at "1" indicates the communication interface 461, the program may transmit the message to the segment 471 through the communication interface 461.

As a result of comparing the route information 603 registered in the request message 532(1)572 with the road attribute 1052 in the route information table 1050, when it is revealed that the road and direction indicated by the route information 603 have not been registered in the route information table 1050 (step 905), the relay device discards the message (step 907). Conversely, when the road and direction indicated by the route information 603 are registered in the route information table 1050 (step 905), the relay device reads the interface ID 1052 indicated by the road attribute 1051, and broadcasts the message to the associated segment through the corresponding communication interface (step 906). By executing the processing illustrated in FIG. 9 by the relay device, the request message 532(*a*) is transmitted in the advancing direction of the vehicle. When the vehicle is far away from the relay device, the message is discarded, thereby making it possible to prevent the message from being broadcast without limit.

Figure 11:
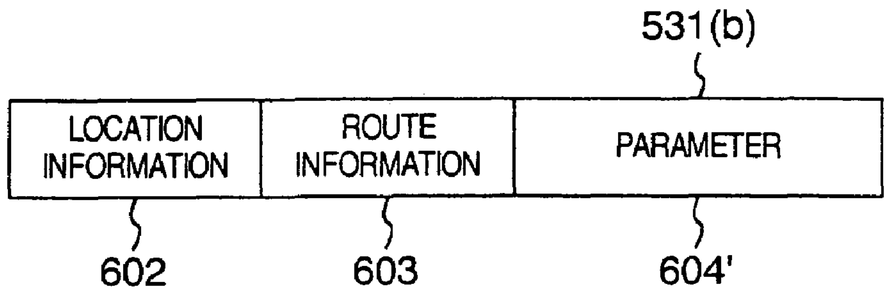
FIG. 11 shows a format for a request message which does not use a service code.

While the foregoing embodiment has shown a scheme in which the service code 601 is added to the request message 531(*a*), the service code 601 is not required when each road side station has only one processing program for executing a service, or when designation of a requested service is described as a parameter. In this case, the request message may be formatted as shown in FIG. 11. Specifically, the shown request message 531(*b*) is comprised of location information 602; route information 603; and a parameter 604'. When each road side station is provided with a plurality of processing programs for executing services installed therein, the parameter 604' can be used to specify which processing is executed.

Figure 12:
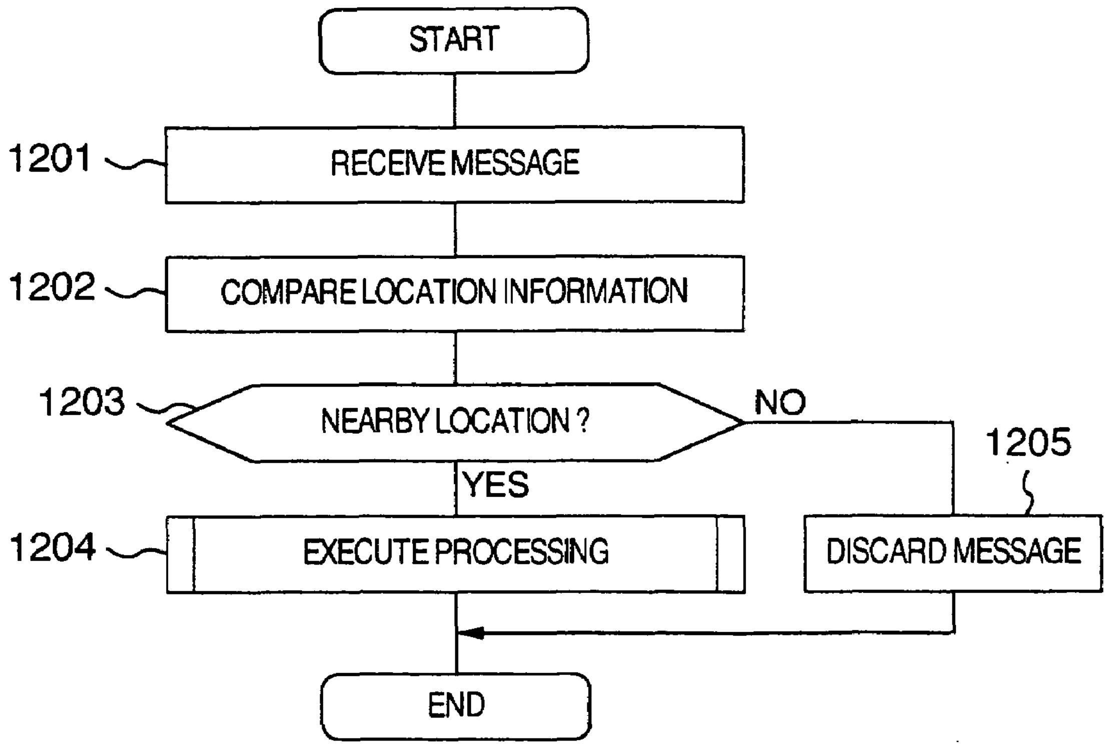
FIG. 12 is a flow chart illustrating a processing flow which is executed by a road side station upon receipt of a request message which does not use a service code.

FIG. 12 illustrates the processing on each road side station which receives the request message 531(*b*). Upon receipt of the request message 531(*b*) (step 1201), each road side station compares location information 602 in the request message 531(*b*) with location information registered in the location information table stored therein (step 1202). When the distance between the two locations is longer than distance information previously registered in the road side station (step 1203), the road side station discards the received request message 531(*b*) (step 1205). When the service code is not used, no service code table is required, and instead of the service code table, the road side station holds a table in which one piece of distance information is registered. When the distance between the two locations is shorter than the distance information previously registered in the road side station (step 1203), the road side station executes the processing (step 1204). A procedure performed by the relay device to process the request message 531(*b*) is the same as the processing flow illustrated in FIG. 9. In this way, the processing is executed even without using the service code.

Figure 13:
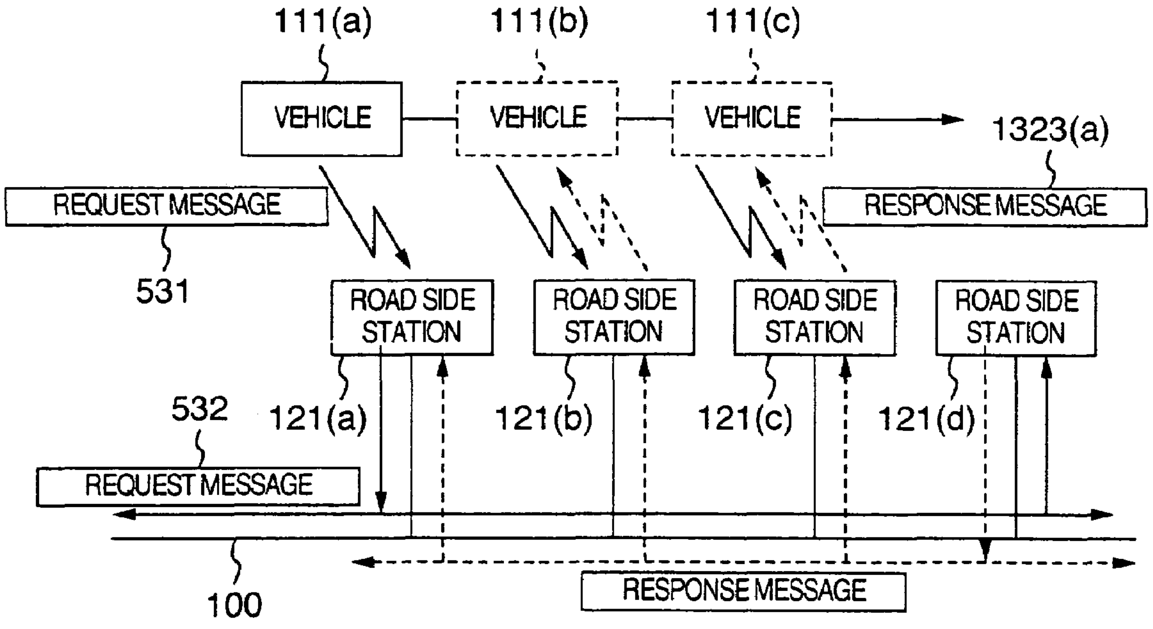
FIG. 13 shows a message flow in a processing request which requires a response.

Next, for the case (II), FIG. 13 shows an example of a message flow. Road side stations 121(*a*)–121(*d*) are connected to a segment 500. Upon receipt of a request message 531 from a vehicle 111(*a*), the road side station 121(*a*) broadcasts a request message 532 to the segment 500. The road side stations connected to the segment 500 receive the request message 532, determine whether or not they execute requested processing in accordance with the contents of the request message 532, and execute the requested processing when they determine to that effect. The result of the processing is broadcast to the segment 500 as a response message 1323(*b*).

In this event, the vehicle 111(*a*) which has transmitted the request message 531 may be running. If the vehicle 111(*a*) is stationary, the road side station 121(*a*) which has received the request message 531 receives the response message 1323(*b*), and transmits a response message 1323(*a*) to the vehicle 111(*a*). However, if the running vehicle 111(*a*) has already moved to a location indicated by a vehicle 111(*b*), the road side station 121(*a*) can no longer transmit the response message 1323(*a*) to the vehicle 111(*a*).

For this reason, the response message 1323(*b*) is also received by other road side stations 121(*b*), 121(*c*), in addition to the road side station 121(*a*). When the vehicle 111(*a*) has moved to the location indicated by the vehicle 111(*b*), the road side station 121(*b*) transmits the response message 1323(*a*) to the vehicle. However, if the response message 1323(*a*) includes a large amount of data, the vehicle is likely to move out of a region in which the vehicle can communicate with the road side station 121(*b*) in the middle of the transmission of the response message 1323(*a*) from the road side station 121(*b*) to the vehicle 111(*a*). If the vehicle 111(*a*) has moved to a location indicated by a vehicle 111(*c*) and fails to communicate with the road side station 121(*b*), the road side station 121(*c*) continuously transmits the response message 1323(*a*) to the vehicle 111(*a*) which has moved to the location indicated by the vehicle 111(*c*). The processing of the road side station in this event will be described below.

Figure 14:
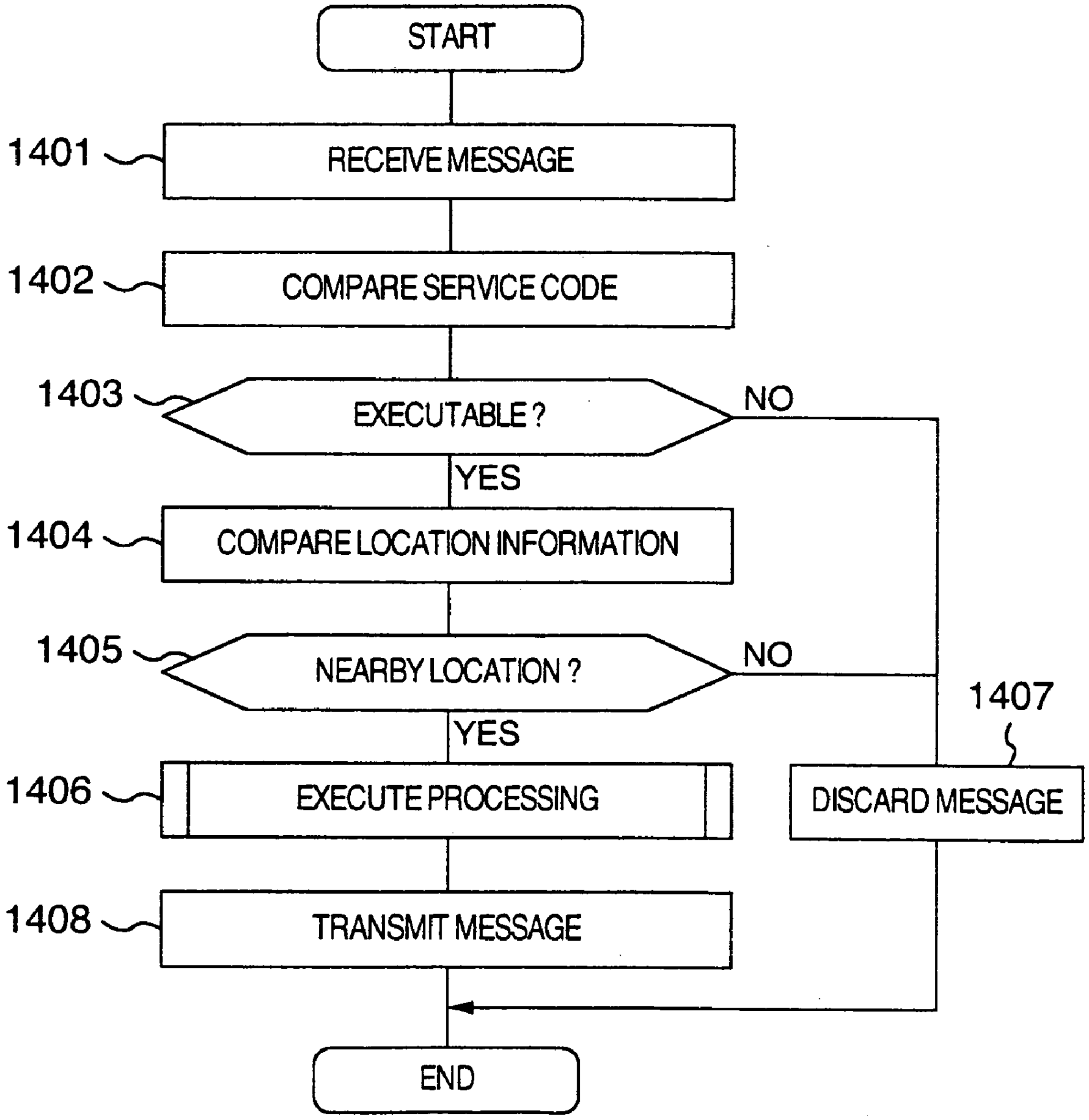
FIG. 14 is a flow chart illustrating a processing flow executed by the road side station upon receipt of a processing request which requires a response.
Figure 15A:
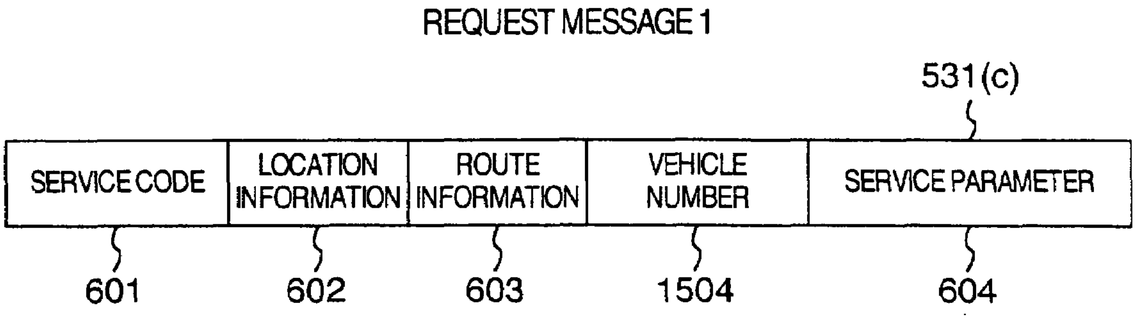
FIGS. 15A and 15B show formats for request messages in a processing request which requires a response, respectively.

FIG. 14 illustrates a processing flow executed by the road side station upon receipt of a request message 532 from the segment 500. Steps 1121(*a*) to 1407 shown in the processing flow are identical to steps 701 to 707 in FIG. 7. After executing the processing indicated by a service code in the request message 532 (step 1406), the road side station broadcasts a response message 1323(*b*) to the segment 500 (step 1408). The request message 531 transmitted by the vehicle is identical in massage format to the request message 532 transmitted by the road side station. The message format for the request message is shown in FIG. 15A.

Figure 16A:
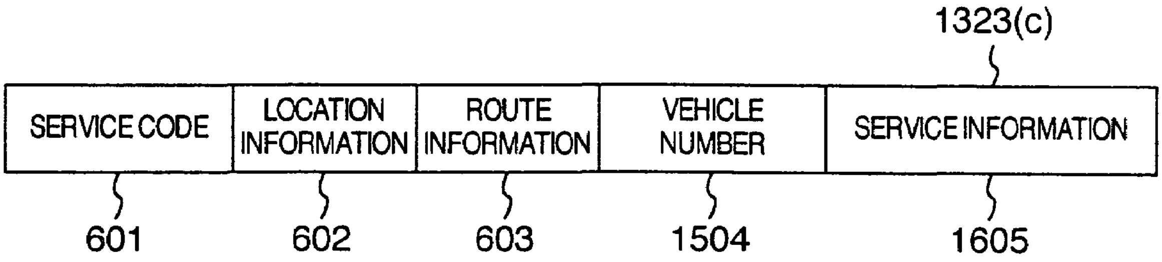
FIGS. 16A and 16B show message formats for response messages, respectively.

The shown request message 531(*c*) differs from the request message 531(*a*) in the case (I), the message format of which is shown in FIG. 6, in that a vehicle number 1504 is added. The vehicle number 1504 may be, for example, a chassis number which is an identifier uniquely assigned to the vehicle. If a response is required for processing, it is necessary to identify the requester of the processing. For this reason, the vehicle number 1504 is added to the request message 531(*c*) which is then transmitted to road side stations. In this regard, this embodiment can also be applied when an originator of a request message is different from a destination which receives a requested service. In other words, the vehicle number 1504 may be regarded as the vehicle number of a vehicle which receives a service rather than the vehicle number of a vehicle which transmits the request message. In this event, a response message, later described, may be returned to the originator of the request message 531(*c*) as well. In the returned response message 1531(*a*), service information may be replaced with confirmation information indicating that service information has been transmitted to a destination which receives a service. Alternatively, the vehicle number 1504 may include a plurality of vehicle numbers such that a plurality of vehicles can receive a service. Here, the plurality of vehicles may include the originator of the request message. A message format for the response message 1323(*b*) transmitted by the road side station is shown in FIG. 16A.

The road side station stores data identical to a service code 601 of the request message 531(*c*) in a service code 601 of the response message 1323(*b*); data identical to location information 602 of the request message 531(*c*) in location information 1 602 of the response message 1323(*b*); data identical to route information 603 of the request message 531(*c*) in route information 603 of the response message 1323(*b*); and data identical to the vehicle number 1504 of the request message 531(*c*) in a vehicle number 1504 of the response message 1323(*b*). Service information 1605 indicates the result of processing executed by the road side station. The vehicle number 1504 is an identifier for identifying a vehicle to which the response message 1531(*a*) is returned. The vehicle number 1504 may be used to confirm whether or not a vehicle which is the originator of the request message can receive the service. With a previously defined vehicle number, the processing may be executed. For example, a credit card number may be linked to the vehicle number, such that the charge for a requested service may be settled with a credit card having the credit card number corresponding to the transmitted vehicle number. For the settlement with the credit card, the procedure may be controlled such that the settlement is permitted when the vehicle number indicates the originator of the request message, and the settlement is rejected when the vehicle number indicates a vehicle which receives the service. However, even when the vehicle number indicates a vehicle which receives the service, the payment may be made by the originator based on information for identifying the originator of the message, added to the request message. Alternatively, if the vehicle which receives the service transmits information indicating that it can pay for the service (for example, in the form of response message), the charge for the service may be settled using the vehicle number as described above. The correspondence relationship between the credit card number and the vehicle number may be contained in the road side station. In this configuration, the charge for the service may be settled by a road side station which has executed the processing. Alternatively, the correspondence relationship may be contained in a different computer, not shown. For example, the network may be connected to a computer in a bank or a credit card company, such that the settlement is executed by this computer.

The road side station adds the result of the processing to the response message 1323(*b*) as the service information 1605, and broadcasts the resulting response message 1323(*b*) to the segment 500.

Figure 17:
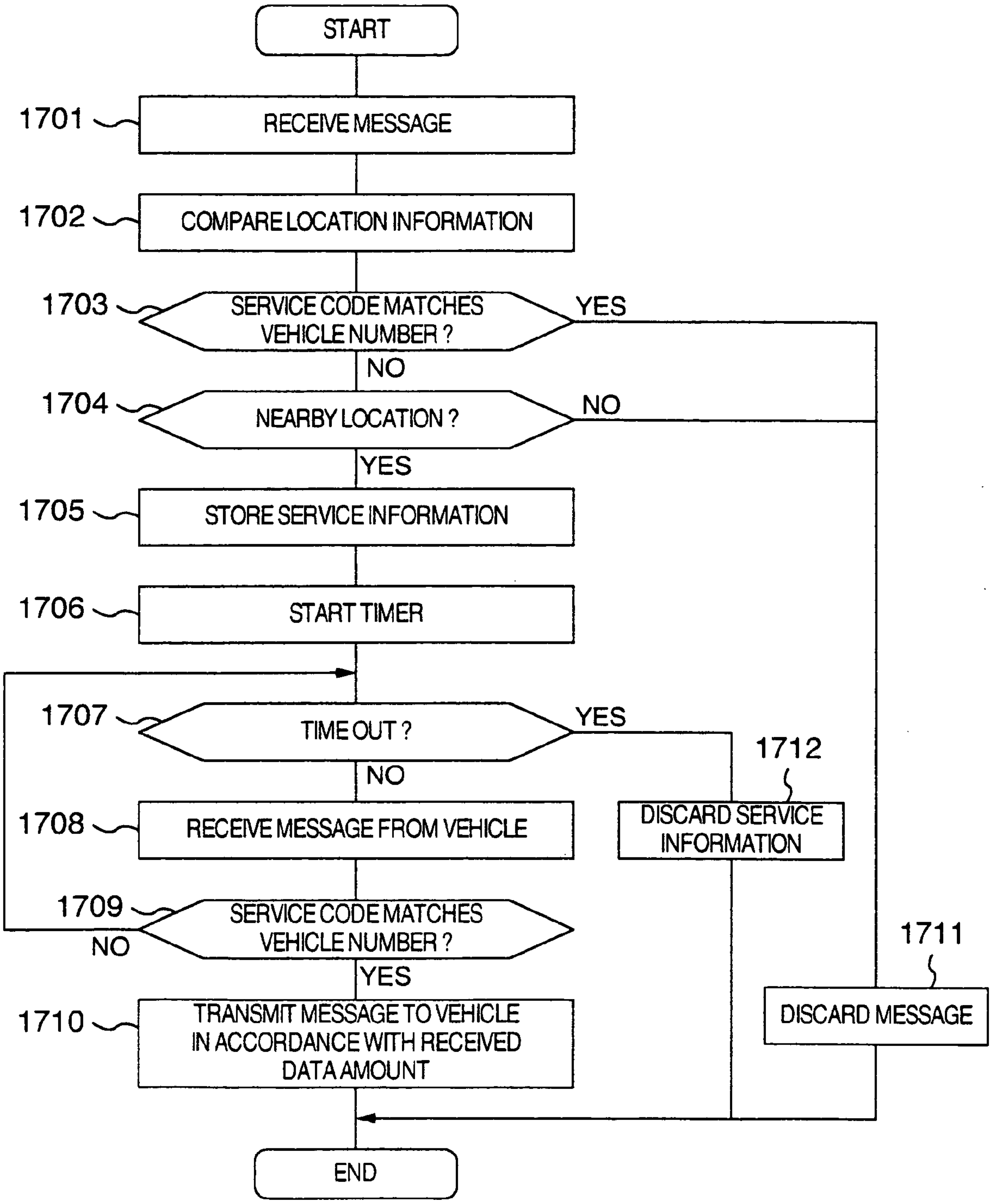
FIG. 17 is a flow chart illustrating a processing flow which is executed by the road side station upon receipt of a response message.
Figure 18:
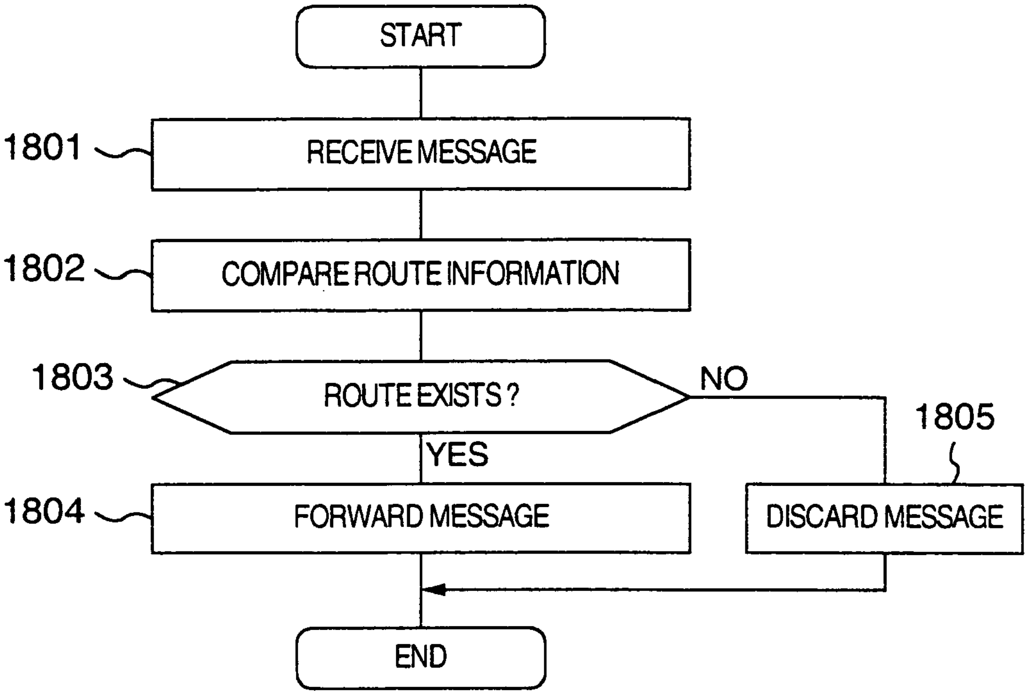
FIG. 18 is a flow chart illustrating a processing flow which is executed by the relay device upon receipt of a response message.

The response message 1323(*b*) is received by all road side stations connected to the segment 500. FIG. 17 illustrates a processing flow executed by a road side station when it receives the response message. Upon receipt of the response message (step 1701), the road side station reads a service code 601 and a vehicle number 1504 in a response message 1531(*a*), and confirms whether another response message 1531(*a*) containing the same service code 601 and the vehicle number 1504 has been received within a fixed period of time (for example, 60 seconds) (step 1702). While FIG. 13 shows an example in which a single road side station (road side station 121(*d*)) receives a request message 532 and executes associated processing, a plurality of road side stations may receive the request message and execute the same processing.

For example, this may be the case where the same processing or data is downloaded to a plurality of road side stations for multiplexing the processing. In this event, a plurality of response messages 1323(*b*) are received for the same processing request. When a road side station receives a plurality of response messages 1323(*b*) for the same processing request, the road side station receives only the first response message 1323(*b*) for processing. Determination at step 1703 is made to discard the second and subsequent response messages 1323(*b*) for a single processing request. When the road side station receives response messages 1323(*b*) for the same processing request within a fixed period of time, i.e., when the road side station receives response messages 1323(*b*) containing the same service code 601 and vehicle number 1504 (step 1703), the road side station discards the response messages 1323(*b*) (step 1711), followed by the termination of the processing flow. When the road side station does not receive other response messages 1323(*b*) for the same processing request (step 1703), the road side station reads location information 1 602 in the response message 1531(*a*), and compares the read location information 1 602 with location information registered in the location information table 850 stored therein.

When the distance calculated from the two pieces of location information is longer than a previously registered distance (for example, 10,000 meters) (step 1704), the road side station discards the response message 1323(*b*) (step 1711), followed by the termination of the processing flow. Conversely, when the distance calculated from the two pieces of location information is shorter than the previously registered distance (step 1704), the road side station reads the service information 1605 in the response message 1531(*a*), and saves the read service information 1605 in the RAM 203 or the hard disk 240 (step 1705). At this time, the road side station starts a timer (step 1706).

The timer measures a period of time for which the service information 1605 is saved. For saving a large number of service information 1605, the memory and the hard disk are required to have large capacities. However, as the vehicle 111(*a*) has moved to a remote location, the service information 1605 for transmitting to the vehicle 111(*a*) becomes useless, so that the service information 1605 is automatically discarded when a fixed period of time has elapsed. After the timer is started (step 1706), when time-out occurs (step 1707), the service information stored in the road side station is discarded (step 1712).

When the road side station receives a request message from the vehicle 111(*a*) before time-out occurs (step 1707), and a service code and a vehicle number in the received request message match the service code and the vehicle number, respectively, of the received response message 1323(*b*) (step 1709), the road side station transmits the response message 1323(*a*) to the vehicle 111(*a*) (step 1710). When the service codes and the vehicle numbers do not match, respectively (step 1709), the road side station again waits for a request message from the vehicle 111(*a*) until the timer times out.

Figure 15B:
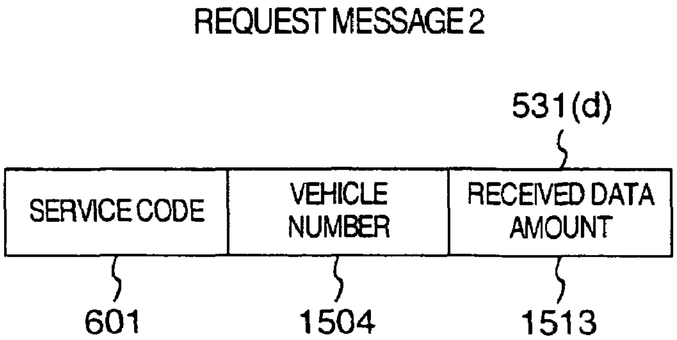
Figure 16B:
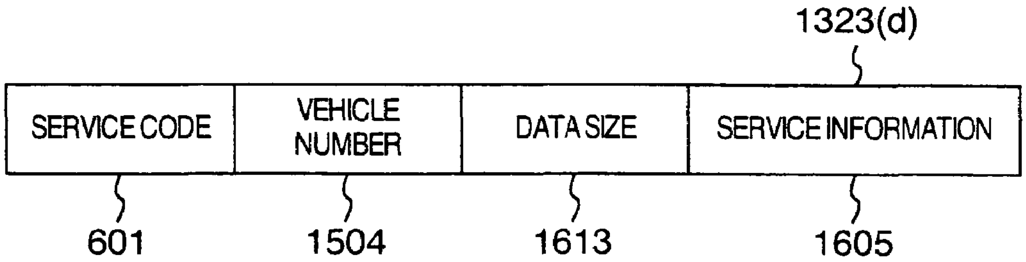

FIG. 15B shows a format for the request message 531 received by the road side station, which has received the response message 1323(*b*), from the vehicle 111(*a*), and FIG. 16B shows a format for the response message 1323(*a*) transmitted to the vehicle 111(*a*) by the road side station which has received the response message 1323(*b*). After transmitting once the request message 531(*c*) in the format shown in FIG. 15A, the vehicle 111(*a*) periodically transmits the request message 531(*d*) in the format shown in FIG. 15B, and waits for the response message 1323(*a*) in the format shown in FIG. 16B to reach. The request message 531(*d*) is comprised of a service code 1121(*a*), a vehicle number 1121(*b*), and a received data amount 1121(*c*). The service code 1121(*a*) and the vehicle number 1121(*b*) are identical to the service code 601 and the vehicle number 602 in the request message 531(*c*) shown in FIG. 15A. The received data amount 1121(*c*) indicates the accumulated amount of the service information 16051614 received through the response message 1323(*a*), and is set to "0" (received data amount (1121(*c*))=0), for example, when the road side station has never received the response message 1323(*a*).

The response message 1323(*b*) is comprised of a service code 601, a vehicle number 1504, a data size 1613, and service information 1605. The data size 1613 indicates the total amount of data in service information transmitted from the road side station to the vehicle, and identical to the data amount of the service information 1605 in the response message 1531(*a*). The service information 1605, which is identical to the service information in the response message 1531(*a*), stores the service information except for the number of bytes indicated by the received data amount when data other than zero is set in the received data amount 1121(*c*) in the request message 531(*d*) received from the vehicle 111(*a*). For example, when the received data amount 1121(*c*) in the request message 531(*d*) indicates 10,000 bytes, the vehicle 111(*a*) has already received 10,000 bytes of data, so that the road side station stores the service information 1605 of the response message 1531(*a*) from the 10,001st byte, except for the first 10,000 bytes, in the service information 1605, and transmits the response message 1323(*b*)1610 to the vehicle 111(*a*). When the received data amount 1121(*c*) in the request message 531(*d*) becomes equal to the data size 1613 in the response message 1323(*b*)1610, i.e., when the vehicle 111(*a*) has fully received the service information 16051614, the vehicle 111(*a*)1301 transmits a request message 531(*d*) 1510 once, and then stops periodically transmitting the request message.

Next, description will be made on the processing executed by the relay device in the case (II). Specifically, the following description will be given for an example in which the relay device is installed between road side stations 121(*c*) and 121(*d*). The relay device processes the request message 532 in the same manner as that illustrated in FIG. 9. The processing on the response message 1323(*b*) by the relay device is described with reference to a processing flow illustrated in FIG. 18. Upon receipt of the response message 1323(*b*) (step 1801), the relay device compares a road attribute 1051 in the route information table 1050 with route information 603 in the response message 1323(*b*) (step 1802). The processing on the response message differs from the processing on a request message in that a route from a destination back to a current location is calculated based on the route information 603. The relay device determines whether or not a road attribute 1051 of a road directing to the current location has been registered in the route information table 1050. When the route directing to the current location of the vehicle 111(*a*) exists (step 1803), the relay device transmits the response message 1323(*b*) to the route (step 1804). Conversely, if such a route does not exist (step 1803), the relay device discards the message (1805).

In the processing schemes involved in the cases (I), (11) shown herein, if the vehicle has changed its destination, the vehicle will take a different course from that indicated by the route information transmitted thereby in the request message. In this event, some problems would arise, for example, the vehicle cannot receive the response message or cannot execute appropriate processing, or the like. To solve these problems, the vehicle again transmits the request message when it selects a different route from that indicated by the route information in the request message, after the request message has been transmitted, and takes a different road from that indicated by the route information at a branch point or the like.

The foregoing description has been made on the transport system, where a large number of road side stations installed along roads and vehicles locally cooperate based on location information to execute the processing. In this way, any processing can be executed only by the road side stations and the vehicles, without relying on a server machine for totally managing the system, thereby making it possible to prevent a delay in response and longer execution time for processing due to processing loads concentrated on the server machine. It is also possible to avoid entire system shut-down due to a failure in the server machine, so that even if a particular road side station fails, the remaining road side stations can continue the processing. Further, critical processing and data can be downloaded to a plurality of road side stations for multiplexing. Since a relay device is installed between respective segments forming part of the road side communication network such that the relay device determines based on location information and route information whether or not a message should be forwarded, it is possible to avoid transmitting a processing request message and a response message to irrelevant segments. In this way, the massages are only transmitted and received between those road side stations and vehicles within a local region, which are relevant to particular processing, thereby making it possible to avoid a problem of increased communication loads due to the messages processed by irrelevant road side stations, and a problem of increased traffic on the communication path.

Next, the following description will be made on an accident treatment service system and a local information service system which are implemented using the foregoing transport system. The accident treatment service system employs the processing scheme (I) which does not require a response, while the local information service system employs the processing scheme (II) which requires a response.

Figure 19:
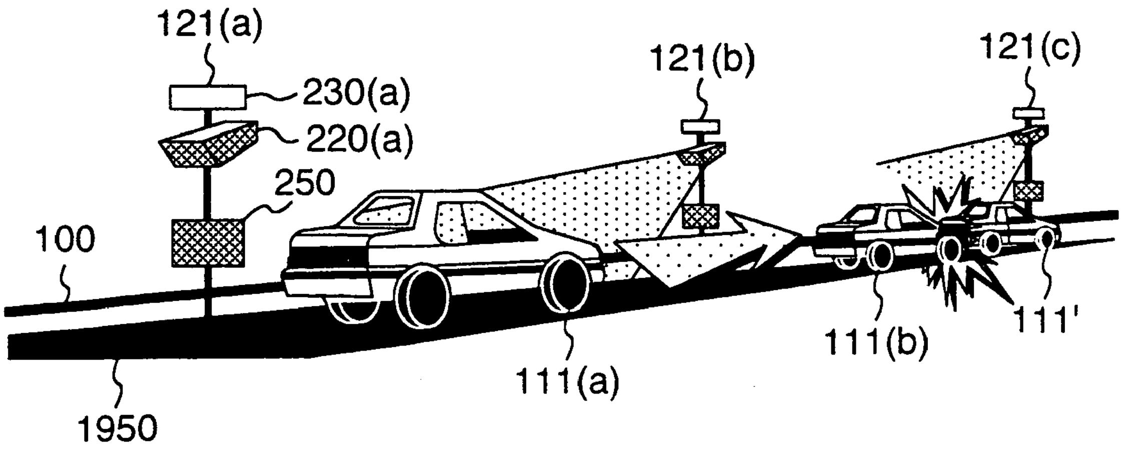
FIG. 19 is a schematic diagram illustrating an exemplary configuration of an accident treatment service system and constituent road side stations.
Figure 20:
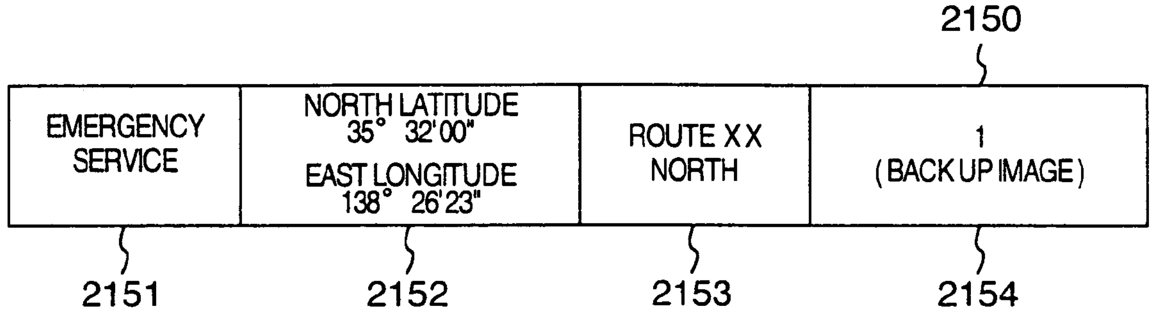
FIG. 20 shows a message format for a request message in the accident treatment service system.

FIG. 19 illustrates the configuration of the accident treatment system. A vehicle 111(*a*) is running on a road 1950. A road side communication network 100 is installed along the road 1950. Road side stations 121(*a*)–121(*c*) are also installed along the road 1950. These road side stations 121(*a*)–121(*c*) are connected to the road side communication network 100, and therefore can transmit and receive messages through the road side communication network 100. A vehicle 111' is running ahead of the vehicle 111(*a*), and the vehicle 111(*a*) collides with the vehicle 111', running in front, from the behind, at the time the vehicle 111(*a*) reaches a vehicle location 111(*b*). The accident treatment service system automatically backs up information necessary to reproduce the accident situation by cooperation of the road side stations 121(*a*)–121(*c*).

FIG. 19 illustrates the configuration of the road side station. The road side station comprises an antenna 230(*a*) which contains a radio communication unit for performing DSRC-based radio communications; a camera 220(*a*) which contains an image processor for imaging; and a computer unit 250 which contains a computer and a hard disk. The antenna 230(*a*) is an example of the radio communication unit 230 shown in FIG. 2, the camera 220(*a*) is an example of the external device 220 shown in FIG. 2, and the computer unit 250 is an example of the computer 250 and the hard disk 240 in FIG. 2. The computer unit 250 comprises a communication interface 211 through which it is connected to the road side communication network 100.

Figure 21:
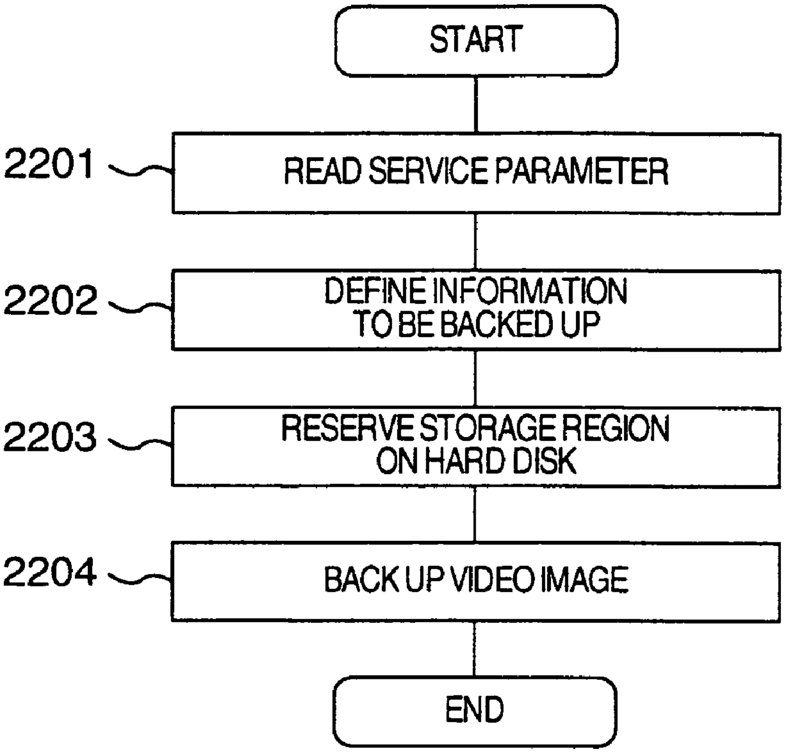
FIG. 21 is a flow chart illustrating an example of processing executed by road side station in the accident treatment service system.

As the vehicle 111(*a*) collides with the vehicle 111' from behind, the impact of the collision is sensed by an acceleration sensor contained in the vehicle 111(*a*) to automatically detect that the collision has occurred. The acceleration sensor forms part of the external device 360 in the vehicle-equipped device 300, and its data is read by the processor 301 through the external interface 314. Upon detection of the occurrence of the collision from the magnitude of a change in acceleration, the processor 301 transmits a request message 531, through a radio communication, which is received by a nearby road side station 121(*c*). Upon receipt of the request message 531, the road side station 121(*c*) broadcasts a request message 532 to the road side communication network 100. These messages are received by all road side stations connected to the same segment. The road side stations 121(*a*)–121(*c*) autonomically determine from the received request message 532 and a service code table 800 that the road side station 121(*c*) requesting the execution of processing is a road side station installed near the location at which the accident occurred, and that the requested processing can be executed, by executing the processing flow illustrated in FIG. 7. Here, the determination as to whether the road side station is installed near the location at which the accident occurred is made by a trajectory followed by the colliding vehicle 111(*a*) a predetermined period of time before the time the accident occurred, and whether the respective road side stations 121(*a*)–121(*c*) are located within a predetermined distance. Alternatively, the determination may be made by checking whether the camera possessed by each road side station 121(*a*)–121(*c*) has captured at least a portion of the trajectory followed by the vehicle 111(*a*) the predetermined period of time before the time the accident occurred. In other word, a road side station which has captured a portion of the trajectory may be determined to be located in the neighborhood. Determination as to whether a camera has captured the trajectory may be made by checking whether an image captured by the camera includes the vehicle 111(*a*) based on the transmitted vehicle number. Also, a predetermined number of road side stations from the location at which the accident occurred in the direction opposite to the advancing direction of the vehicle 111(*a*) may be determined to be located in the neighborhood. FIG. 21 shows an exemplary structure of a request message in the accident treatment service system. A service code 2151 stores a service code indicative of an emergency service; location information 2152 stores coordinate information for identifying the location of the vehicle 111(*a*) which has caused the collision accident; and route information 2153 stores information on roads to a destination of the vehicle. A service parameter 2154 stores a parameter indicating that a backup of the image is requested. For example, the service code 2151 is a two-byte integer value; the location information 2152 is array data of integer values; the route information 2153 is string data; and the service parameter 2154 is array data of integer values.

The processing at step 706 in the accident treatment service system will be described with reference to FIG. 22. The road side station reads the service parameter 2154 (step 2201) to confirm detailed contents of requested processing. In this example, the road side station is requested to back up image information as an emergency service. The road side station defines video information captured within a predetermined period of time (for example, five minutes) as information to be backed up (step 2202), and reserves a portion of the capacity of the hard disk for storing this information (step 2203). The video information captured by the road side station is stored in the RAM 203, but is overwritten in a fixed period of time and lost. For saving the video information, the information stored in the RAM 203 must be copied to the hard disk 240. At step 2202, the road side station defines a region in the video information stored in the RAM 203 to be backed up, and at step 2203, the road side station reserves a region on the hard disk for backing up the video information. As the backup region is reserved on the hard disk (step 2203), the image information is backed up in this region(step 2204).

Figure 22A:
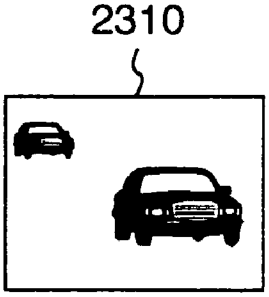
FIGS. 22A, 22B and 22C show examples of stored information in the road side station in the accident treatment service system.
Figure 22B:
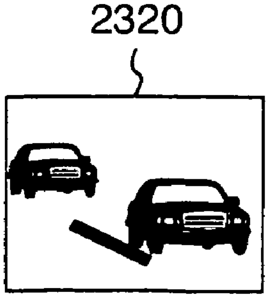
Figure 22C:
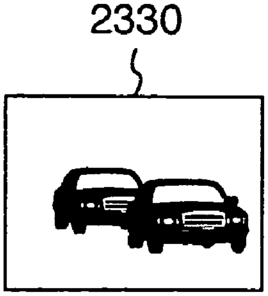

With the foregoing processing, the road side stations near the location at which the collision accident occurred backs up the video information captured within the fixed period of time in the hard disk. FIGS. 22A through 22C illustrate examples of backed up image information. Specifically, FIG. 22A illustrates video information backed up by the road side station 121(*a*); FIG. 22B illustrates video information backed up by the road side station 121(*b*); and FIG. 22C illustrates video information backed up by the road side station 121(*c*). The video information 2330 backed up by the road side station 121(*c*) shows just the location at which the collision accident occurred, and saves a scene at the moment the collision accident occurred. The video image 2320 backed up by the road side station 121(*b*) captures a location immediately short of the spot at which the collision accident occurred, and saves a scene which shows a running state of the vehicle slightly before the spot at which the collision accident occurred.

For example, the road side station 121(*c*) may back up a video image which shows that the front vehicle 111' jammed on the brakes. The video information 2310 backed up by the road side station 121(*a*) captures a location far before the spot at which the collision accident occurred, and saves a scene which shows a running state of the vehicle until it had been running toward the spot at which the collision accident occurred. For example, the video information 2310 may save a scene which shows that the vehicle 111(*a*) scarcely overtook a vehicle.

The foregoing accident treatment service system has been described for an example in which the road side stations installed along a road and vehicles locally cooperate with each other to allow a road side station near the spot at which the accident occurred to execute appropriate processing to save the accident occurring spot and detailed situations until the accident occurred. This eliminates works involved in an on-the-spot inspection at the accident spot such as detailed circumstance hearing, verification of skid mark of the vehicle, and so on, thereby largely reducing burdens of the accident treatment. It is also possible to largely reduce a time required for the accident treatment and avoid traffic jam caused by the accident and subsequent treatment. Particularly, the accident treatment service system can solve the problem of traffic jam due to an accident which is serious on main roads.

Figure 23:
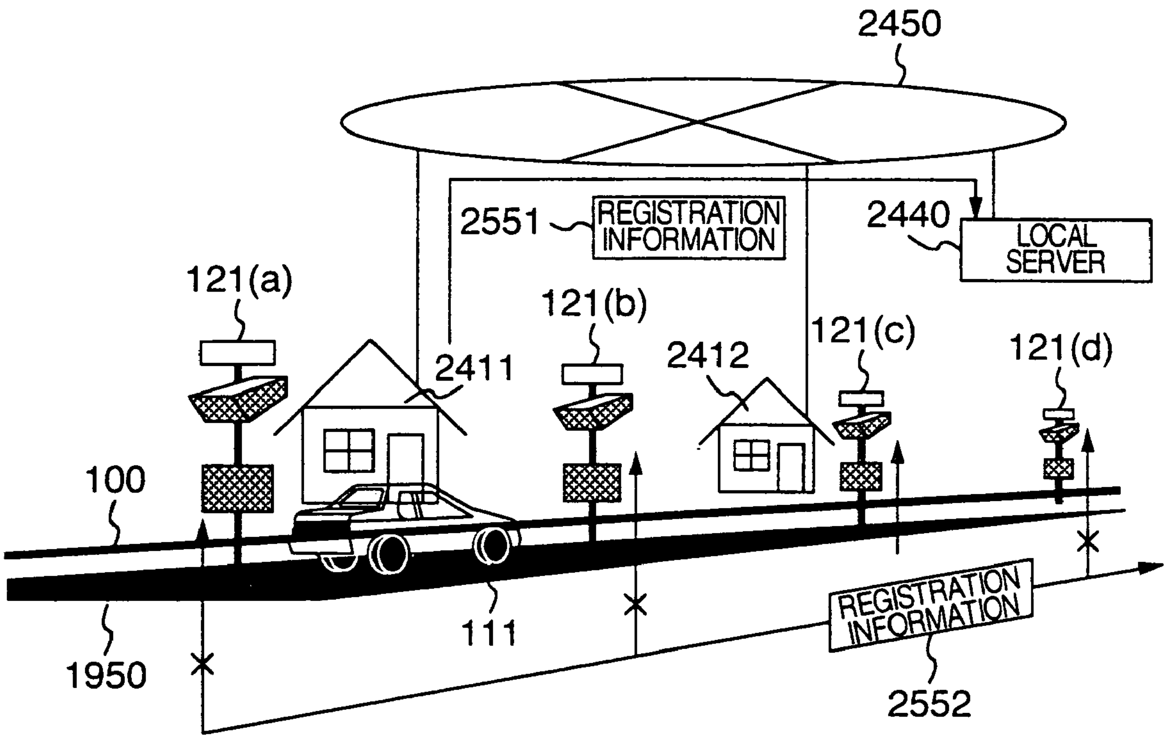
FIG. 23 illustrates an exemplary configuration of a local information service system and a message flow during information registration in the system.

FIG. 23 illustrates the configuration of a local information service system. A vehicle 111 is running on a road 1950. Also, road side stations 121(*a*)–121(*d*) are installed along the road 1950, and are connected to a road side communication network 100 to allow mutual transmission and reception of messages therethrough. In the configuration of FIG. 23, new system components are added to the configuration of FIG. 13 for restaurants, stores, amusement park and so on located near the road 1950 to register information in the road side stations. A restaurant 2411 and a restaurant 2412, located along a road 2220, register information on the restaurants in nearby road side stations. Each restaurant is equipped with a computer (for example, a personal computer) as an information terminal which is connected to a local server 2440 through a wide area communication network 2450. Each restaurant can transmit information from the information terminal to the local server 2440. The local server 2440 is connected to the road side communication network 100, so that it can communicate with the respective road side stations through the road side communication network 100. The following description will be given on how each restaurant registers information in the road side station.

Figure 24:
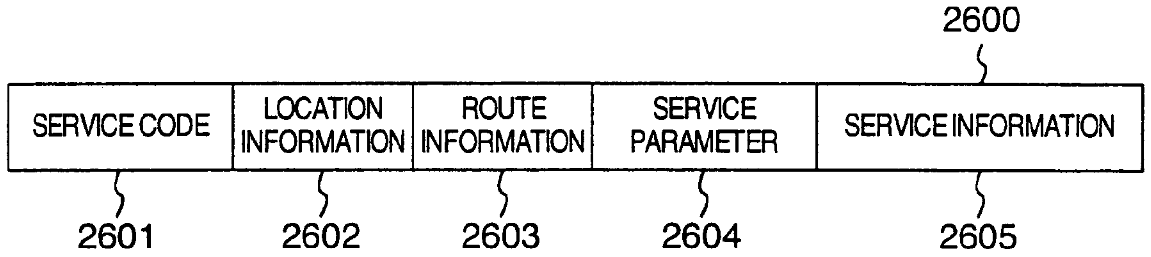
FIG. 24 shows a message format for registered information in the local information service system.

Reference is also made to a message flow involved in the registration of information shown in FIG. 24. Restaurant information terminals 2121(*a*), 2121(*b*), not shown, and the local server 2440 are connected to the wide area communication network 2450, and the local server 2440 and the road side stations 121(*a*)–121(*d*) are connected to the road side communication network 100. Each restaurant autonomically registers information on advertisement of the restaurant itself for broadcasting to drivers of vehicles running nearby in the road side stations installed near the restaurant. This information on the advertisement is hereinafter referred to as "registration information." The owner of the restaurant enters the registration information 2551 in the restaurant information terminal 2121(*b*) which transmits the registration information 2551 to the local server 2440. The local server 2440 may be installed, for example, in each prefecture. Assume that each restaurant information terminal previously knows the local server 2440 in a region in which the restaurant is located. The local server 2440, which has received the registration information 2551 from the restaurant information terminal 2121(*b*), broadcasts registration information 2552 to the road side communication network 100.

In this system, road side stations determined to be located near the restaurant may be those which are found in the direction toward the location of the restaurant.

A message format for the registration information is shown in FIG. 24. The registration information 2600 is comprised of a service code 2601 indicating that registration of information is requested; location information 2602 indicative of coordinate information on the location at which the restaurant lies; route information 2603 indicative of a road passing by the restaurant; service parameters 2604; and service information 2605. The service parameters 2604 includes a parameter indicative of information on the restaurant; a parameter indicative of the classification (Chinese, Japanese, Western, and so on) of the restaurant; and a parameter indicative of a price zone for served meals. The service information 2605 is information provided by the restaurant, for example, a menu, the number of parking places, a telephone number, and so on.

Each of the road side stations, which has received the registration information, executes the processing flow illustrated in FIG. 7. Upon receipt of a message, the road side station determines from the service code 2601 that this is registration information for providing information, and then determines whether or not a requester of the processing exists near the road side station. If the requester of the processing exists in the neighborhood, the road side station registers information in a storage medium (for example, a hard disk) installed therein based on the service code 2601. The registered information is retrieved when a driver requests the provision of information on restaurants.

Figure 25A:
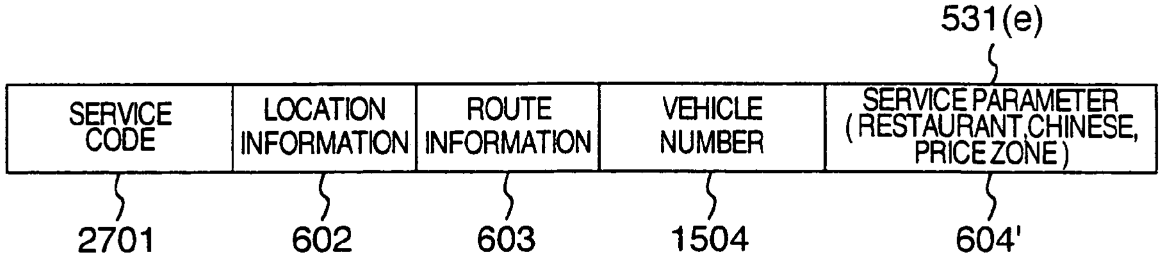
FIGS. 25A and 25B show message formats for a request message and a response message in the local information service system, respectively.
Figure 25B:
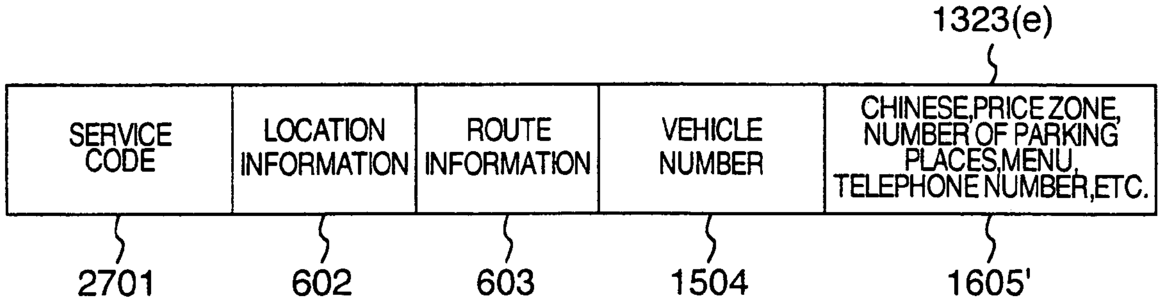
Figure 26:
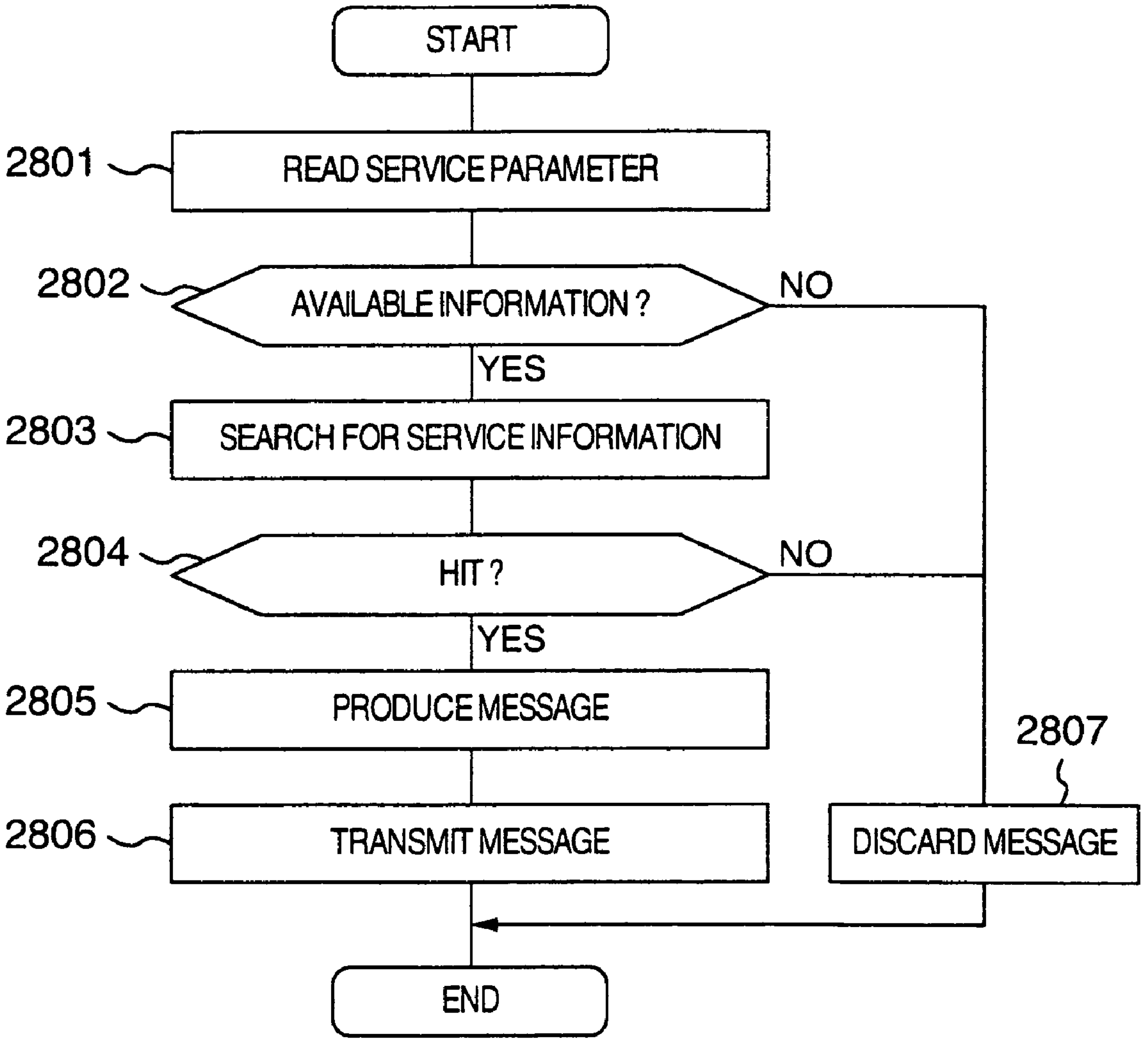
FIG. 26 is a flow chart illustrating an example of processing executed by the road side station in the local information service system.

FIGS. 25A and 25B show exemplary structures of a request message 531(*e*) and a response message 1323(*e*), respectively, in the local information service system. When the driver in a vehicle 111 needs information on restaurants for having a meal, he transmits a request message. The request message transmitted from the vehicle 111 is received by a nearby road side station which broadcasts the request message to the road side communication network 100. The request message 531(*e*) is comprised of a service code 2701 indicating that provision of information is requested; vehicle location information 602; vehicle route information 603; a vehicle number 1504; and service parameters 604'. The service parameters 604' specify the classification of requested information, and indicates restaurants, classification of the restaurants, price zone of served meals, and so on.

Each road side station, upon receipt of the request message 531(*e*), executes the processing flow illustrated in FIG. 14. The contents of the processing at step 1406 in the local information service system is described below with reference to FIG. 28. When the road side station determines to execute the processing, the road side station reads service parameters 604' in the received request message 531(*e*) (step 2801), and determines whether or not requested information can be provided (step 2802).

If the road side station does not have information on restaurants stored therein, the road side station cannot provide the requested information. Upon determining that the requested information cannot be provided (step 2802), the road side station discards the request message 531(*e*) (step 2807). Conversely, upon determining that the request information can be provided (step 2802), the road side station searches for service information which matches a condition specified in the service parameters 604' (step 2803). For example, the road side station searches for Chinese restaurants, and selects the one which offers meals in a price zone closest to that indicated by the service parameters 604' from the extracted Chinese restaurants.

As a result of the search, when no information on Chinese restaurants has been registered (step 2804), the road side station discards the request message since it cannot provide the requested information (step 2807).

Conversely, when information on pertinent Chinese restaurants has been registered (step 2804), the road side station produces a response message which contains the information on the restaurants as service information (step 2805), and broadcasts the resulting response message (step 2806). Step 2806 provides the same processing as step 1408 in FIG. 14. A format for the response message is shown in FIG. 25B. The response message 1323(*e*) is comprised of a service code 2701 indicating that provision of information is requested; location information 602; route information 603; a vehicle number 1504; and service information 1605'. The service code 2701, location information 602, route information 603 and vehicle number 1504 in the response message 1323(*e*) store the same data as those in the corresponding fields of the request message 531(*e*). The service information 1605' stores the information registered by the retrieved restaurant, such as the type of the restaurant (Chinese), a price zone for served meals, the number of parking places, a detailed menu, the telephone number of the restaurant, and so on. Each road side station, which has received the response message, transmits the information to the vehicle 111 through the processing flow illustrated in FIG. 17.

In the local information service system, information providers such as restaurants, stores and so on, which desire to provide information to drivers of vehicles, autonomously register information in nearby road side stations, such that drivers of vehicles are provided with requested information in cooperation of the road side stations and the respective running vehicles. The employment of this system results in elimination of a local server for managing information over an overall region, and permits local information to be provided only through local processing between the road side stations and each vehicle. Since the local server is not relied on to manage all information, as before, requested information can be provided to a requesting driver in a vehicle in a short time even if the local server is heavily loaded with processing. In addition, a failure of the local server will not result in complete shut-down of the local information service, in which case information held by the respective road side stations can be provided to drivers of vehicles, thereby making it possible to continuously provide information.

What is claimed is:

1. An information processing method in a transport system having a plurality of roadside stations disposed along a road and interconnected through a network along the road, said roadside stations each including a radio communication unit for communicating with a mobile body, the method comprising the steps of:

said mobile body transmitting request information to at least one of said plurality of roadside stations, said request information including contents information indicative of contents of a request for a processing for the mobile body, and location information indicative of a location at which said mobile body exists;

a roadside station, which has received said request information, transmitting said request information to other roadside stations through said network; and each of said plurality of roadside stations, which have received said request information, determining to execute a processing for the mobile body based on said location information when a distance between the mobile body and said roadside station along the road falls into a predetermined value, and broadcasting a result of said execution of said processing to said mobile body or to other roadside stations interconnected through the network.

2. The information processing method according to claim 1, wherein:

said mobile body periodically transmits confirmation information to at least one of said roadside stations capable of performing the radio communication until said mobile body receives said result of said execution of said processing after said request information is transmitted; and said mobile body determines that said mobile body is not provided with the result of said execution when said mobile body continues the transmission of the confirmation information for a predetermined period of time without receiving any response.

3. The information processing method according to claim 1, further comprising:

maintaining a result of said execution at the earliest time by one of said roadside stations when said mobile body receives results of said execution from said plurality of roadside stations, and discarding results of the rest of said execution.

4. A transport system having a plurality of roadside stations disposed along roads with relay devices and interconnected through a network along the roads with the relay devices, said roadside stations each including a radio communication unit for communicating with a mobile body, wherein:

each of said roadside stations comprises:

means for directly receiving from the mobile body location information indicative of a location at which the mobile body exists, and route information indicative of a route along which the mobile body is running by using the radio communication unit;

means for broadcasting the location information and the route information to other roadside stations interconnected through the network;

means for determining to execute a processing for the mobile body based on said location information when a distance between the mobile body and said roadside station along the roads reaches a predetermined value; and means for executing said processing for the mobile body based on the determination by said means for determining.

5. The transport system according to claim 4, wherein said mobile body transmits a plurality of requests to said roadside stations, and said transport system further comprises:

means for directly receiving a vehicle number indicative of said mobile body to be sent with a response to said request; and each of said roadside stations further comprises:

means for broadcasting a result of said execution of said processing for the mobile body to said mobile body or to other roadside stations interconnected through the network; and means for determining to execute a processing for the mobile body of said vehicle number, based on said location information when a distance between the mobile body and said roadside station along the road reaches a predetermined value.

6. The transport system according to claim 5, further comprising:

means for starting a timer which measures a period of time for holding said result of said execution of said processing for the mobile body.

7. The transport system according to claim 5, further comprising:

means for calculating a second location information indicative of a location at which said mobile body will exist at the time said processing should be completed, said second location being calculated by a processing unit in other roadside stations.

* * * * *